(12) United States Patent
Berkey et al.

(10) Patent No.: US 6,477,305 B1
(45) Date of Patent: Nov. 5, 2002

(54) LOW WATER PEAK OPTICAL WAVEGUIDE AND METHOD OF MANUFACTURING SAME

(75) Inventors: George E. Berkey, Pine City; Dana C. Bookbinder, Corning; Richard M. Fiacco, Corning; Cynthia B. Giroux, Corning; Daniel W. Hawtof; Dale R. Powers, both of Painted Post; V. Srikant, Ithaca, all of NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 09/547,598

(22) Filed: Apr. 11, 2000

Related U.S. Application Data

(60) Provisional application No. 60/131,033, filed on Apr. 26, 1999.

(51) Int. Cl.[7] .......................... G02B 6/02; C03B 37/018
(52) U.S. Cl. .......................... 385/123; 65/414; 65/422; 65/426
(58) Field of Search .......................... 65/393, 399, 413, 65/414, 417, 421, 422, 424, 426–429, 439; 385/123–128

(56) References Cited

U.S. PATENT DOCUMENTS

| | | | | |
|---|---|---|---|---|
| 4,251,251 A | * | 2/1981 | Blankenship | 65/422 |
| 4,298,365 A | * | 11/1981 | Bailey et al. | 65/32.4 |
| 4,362,545 A | * | 12/1982 | Bailey et al. | 118/728 |
| 4,486,212 A | * | 12/1984 | Berkey | 65/421 |
| 4,515,612 A | * | 5/1985 | Burrus, Jr. et al. | 65/426 |
| 4,578,097 A | * | 3/1986 | Berkey et al. | 65/403 |
| 4,583,997 A | * | 4/1986 | Staudigl | 95/92 |
| 4,664,690 A | * | 5/1987 | Kyoto et al. | 65/30.12 |
| 4,684,383 A | | 8/1987 | Cavender et al. | 65/3.12 |
| 4,734,117 A | | 3/1988 | Pilon et al. | 65/3.12 |
| 4,784,465 A | * | 11/1988 | Berkey | 385/123 |
| 5,397,372 A | | 3/1995 | Partus et al. | 65/391 |
| 5,692,087 A | | 11/1997 | Partus et al. | 385/123 |

FOREIGN PATENT DOCUMENTS

| | | |
|---|---|---|
| EP | 0 082 305 A1 | 6/1983 |
| EP | 0 100 174 A1 | 2/1984 |
| EP | 0 100 174 * | 2/1984 |
| EP | 0 176 263 A2 | 4/1986 |
| EP | 0 311 080 A2 | 4/1989 |
| EP | 0 693 462 A1 | 1/1996 |
| JP | 01-148722 A | 9/1989 |

OTHER PUBLICATIONS

Moriyama et al., "Ultimately Low OH Content VAD Optical Fibres", Electronics Letters, vol. 16, No. 18, Aug. 28, 1980, pp. 698–699.

* cited by examiner

*Primary Examiner*—Akm E. Ullah
*Assistant Examiner*—Michelle R. Connelly-Cushwa
(74) *Attorney, Agent, or Firm*—Robert L. Carlson

(57) ABSTRACT

A cylindrical glass body having a low water content centerline region and method of manufacturing such a cylindrical glass body for use in the manufacture of optical waveguide fiber is disclosed. The centerline region of the cylindrical glass body has a water content sufficiently low such that an optical waveguide fiber made from the cylindrical glass body of the present invention exhibits an optical attenuation of less than about 0.35 dB/km, and preferably less than about 0.31 dB/km at a measured wavelength of 1380 nm. A low water content plug used in the manufacture of such a cylindrical glass body, an optical waveguide fiber having a low water peak, and an optical fiber communication system incorporating such an optical waveguide fiber is also disclosed.

38 Claims, 16 Drawing Sheets

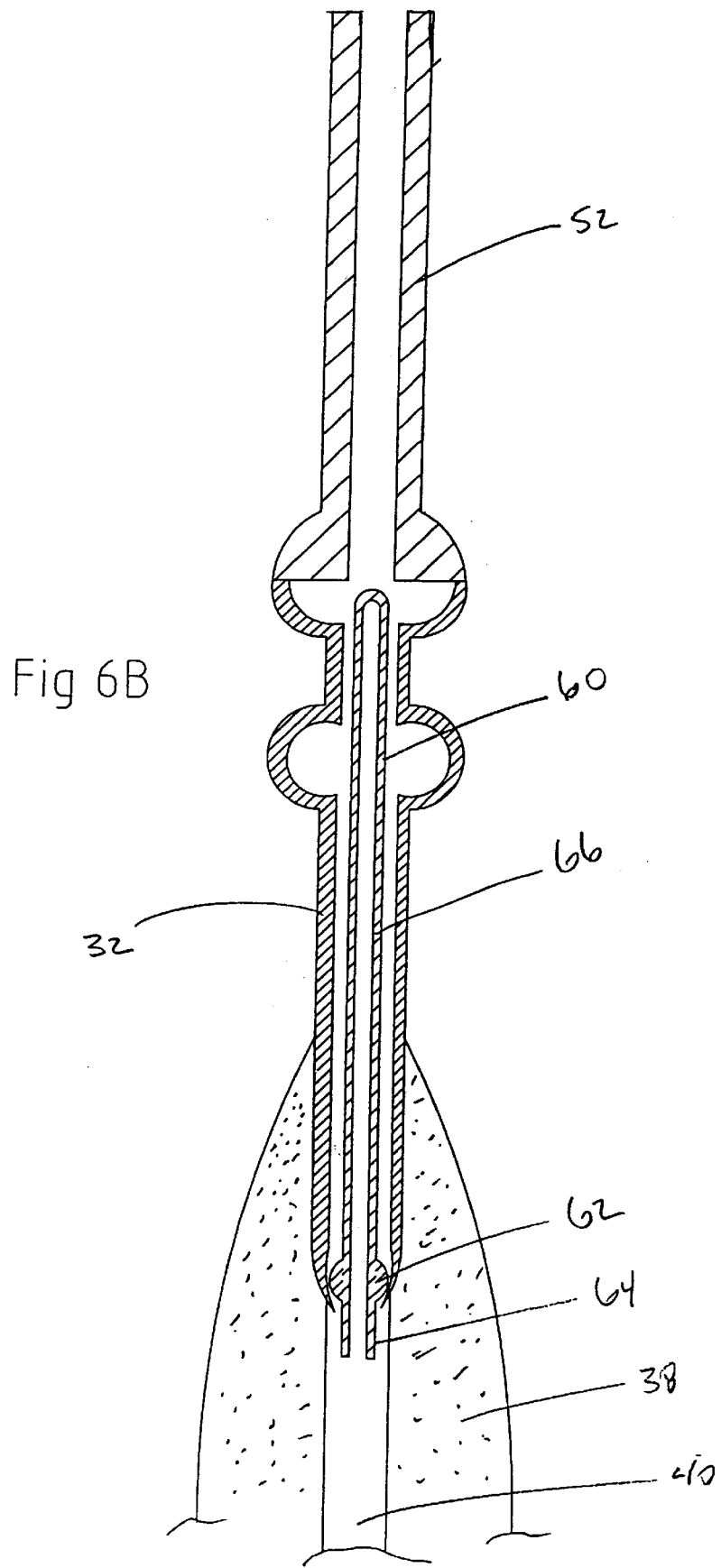

LOW WATER PEAK OPTICAL WAVEGUIDE AND METHOD OF MANUFACTURING SAME

RELATED APPLICATION

This application claims the benefit of the priority date of U.S. Provisional Patent Application No. 60/131,033, filed Apr. 26, 1999, titled "Low Water Peak Optical Waveguide and Method of Making Same".

BACKGROUND OF THE INVENTION

1. Field of the Invention

The present invention relates generally to the field of optical waveguide fibers, and more particularly to optical waveguide fiber preforms and methods of making optical waveguide fiber preforms from which low water peak optical waveguide fibers are formed.

2. Technical Background

Generally speaking, a significant goal of the telecommunications industry is to transmit greater amounts of information, over longer distances, in shorter periods of time. Typically, as the number of systems users and frequency of system use increase, demand for system resources increases as well. One way of meeting this demand is by increasing the bandwidth of the medium used to carry this information over long distances. In optical telecommunications systems, the demand for optical waveguide fibers having increased bandwidth is particularly high.

In recent years, significant advancements have been made in the manufacture of optical waveguide fiber, which in turn have increased the usable light carrying capacity of the fiber. However, as is well known, electromagnetic radiation traveling through an optical waveguide fiber is subject to attenuation or loss due to several mechanisms. Although some of these mechanisms can not be reduced, others have been eliminated, or at least substantially reduced. A particularly problematic component of optical fiber attenuation is the attenuation due to absorption by the optical waveguide fiber of impurities present in the light guiding region of the fiber. Particularly troublesome is the attenuation caused by the hydroxyl radical (OH), which can be formed in the optical waveguide fiber when a source of hydrogen is present in the fiber material, or when hydrogen available from several sources during the fiber manufacturing process diffuses into the glass. Generally speaking, the hydrogen bonds with the oxygen available in the $SiO_2$ and/or $GeO_2$ and/or other oxygen containing compound in the glass matrix to form the OH and/or $OH_2$ bonds referred to generally as "water". The attenuation increase due to OH or water in the glass can be as high as about 0.5 to 1.0 dB/km, with the attenuation peak generally occupying the 1380 nm window. As used herein, the phrase, "1380 nm window" is defined as the range of wavelengths between about 1330 nm to about 1470 nm. The attenuation peak, generally referred to as the water peak, has prevented usable electromagnetic transmission in the 1380 nm window.

Until recently, telecommunications systems avoided the water peak residing in the 1380 nm window by operating in the 1310 nm window and/or the 1550 nm window, among others. With the advent of wavelength division multiplexing ("WDM") and advancements in amplifier technology, which enable telecommunications systems to operate over broad wavelength ranges, it is now likely that all wavelengths between about 1300 nm and about 1650 nm will be used for data transfer in optical telecommunications systems. Removing the water peak from optical waveguide fiber used with such systems is an important aspect of enabling system operation over this entire range.

SUMMARY OF THE INVENTION

One aspect of the present invention relates to a method of fabricating a cylindrical glass body for use in manufacturing optical waveguide fiber. The method includes the steps of chemically reacting at least some of the constituents of a moving fluid mixture that includes at least one glass forming precursor compound in an oxidizing medium to form a silica-based reaction product. At least a portion of the reaction product, which includes hydrogen bonded to oxygen, is collected or deposited to form a porous body. A centerline hole extending axially through the porous body is formed during the deposition process, for example, by depositing the reaction product on a substrate, and thereafter removing the substrate. The porous body is dried and consolidated to form a glass preform, and the centerline hole is closed under conditions suitable to make an optical fiber having optical attenuation of less than about 0.35 dB/km at a wavelength of 1380 nm. Preferably, the fiber exhibits optical attenuation less than 0.31 dB/km at a wavelength of 1380 nm.

In another aspect, the present invention relates to a cylindrical glass body for use in manufacturing optical waveguide fiber that is made by the method described above.

A further aspect of the present invention is directed to an optical waveguide fiber. The optical waveguide fiber includes a silica containing core glass, at least a portion of which includes hydrogen bonded to oxygen. The silica containing core glass further includes a centerline region, at least a portion of which includes a dopant, and is formed by closing a centerline hole of a preform. A cladding glass surrounds the silica containing core glass so that the optical waveguide fiber exhibits an optical attenuation of less than about 0.31 dB/km at a wavelength of about 1380 nm In yet another aspect, the present invention is directed to an optical fiber communication system. The system includes a transmitter, a receiver, and an optical fiber for communicating an optical signal between the transmitter and the receiver. The optical fiber includes a silica containing core glass, at least a portion of which contains hydrogen bonded to oxygen, having a dopant containing centerline region formed by closing the centerline hole of a preform. The optical fiber further includes a cladding glass surrounding the silica containing core glass. Preferably, such an optical fiber exhibits an attenuation of less than about 0.31 dB/km at a wavelength of about 1380 nm.

A still further aspect of the present invention is directed to a method of fabricating a cylindrical glass body for use in manufacturing optical waveguide fiber. The method includes the steps of chemically reacting at least some of the constituents of a moving fluid mixture that includes at least one glass forming precursor compound in an oxidizing medium to form a silica-based reaction product. At least a portion of the reaction product, which includes hydrogen bonded to oxygen, is collected or deposited to form a porous body. A centerline hole extending axially through the porous body is formed during the deposition process, for example, by depositing the reaction product on a substrate, and thereafter removing the substrate. The porous body is dried and consolidated to form a glass preform having a centerline hole, which is subsequently closed. The drying, consolidating, and closing steps are performed under conditions suitable to result in a solid glass body including a centerline region having a weighted average OH content of less than about 1 ppb.

An additional aspect of the present invention relates to a plug for use in sealing the centerline hole of a soot blank used to manufacture optical waveguide fiber. The silica containing glass plug has an OH content of less than about 5 ppm by weight and is preferably chemically dried such that it has an OH content of less than about 1 ppb by weight.

The method of the present invention results in a number of advantages over other methods known in the art. Conventionally, optical waveguide fiber blanks made by an outside vapor deposition (OVD) process are consolidated in a chlorine containing atmosphere to chemically dry the blank and thus form a consolidated glass preform having a centerline hole extending axially therethrough. The core glass preform is then typically positioned within a redraw furnace and heated to a temperature sufficient to facilitate redrawing or stretching of the core preform into a smaller diameter cylindrical glass body or core cane. During the redraw operation, the centerline hole of the core blank is closed by, for example, applying vacuum (e.g., pressure of about 200 mTORR or less) along the centerline hole. The reduction in pressure within the centerline hole ensures complete closure of the centerline hole such that the core cane has a solid centerline region extending axially therethrough.

After the redraw step, the resulting core cane is typically overclad with a layer of cladding soot by depositing a cladding soot, e.g. via an OVD process. Once covered with sufficient cladding soot, the resulting soot overclad core cane is chemically dried and consolidated to form an optical fiber preform, which can thereafter be drawn into an optical waveguide fiber. Despite the chemical drying and consolidation steps, such optical waveguide fibers have been found to exhibit a relatively high level of attenuation measured at approximately 1380 nm. Because telecommunications systems presently in use today do not operate at or in the immediate vicinity of 1380 nm, this shortcoming has been largely overlooked. With recent advancements made in WDM, amplifier technology, and laser sources, however, eliminating the water peak measured at 1380 nm has become a priority. The water peak is largely a result of water being trapped in the glass during the fiber manufacture process. In the case of the OVD process, it is believed that a large portion of the water is trapped within the centerline region of the core cane prior to or during closure of the centerline hole. Although the blanks are chemically dried and sintered during consolidation, it has been found that the region of glass surrounding and defining the centerline hole is being rewet after drying. Most commonly, such rewetting occurs through the physisorption of water ($OH_2$) and/or chemisorption of water (Beta OH) upon exposure of the centerline hole to an atmosphere that includes a hydrogen containing compound, such as, but not limited to water ($H_2O$) following consolidation.

A principle advantage of the method of the present invention is that it greatly reduces the amount of water trapped within the centerline region of the core cane. Accordingly, optical waveguide fiber made from such a core cane exhibits a much smaller water peak at 1380 nm, and in the 1380 nm window as a whole, and therefor exhibits lower optical attenuation in the 1380 nm window than optical waveguide fiber manufactured in accordance with standard methods from preforms manufactured by the OVD process.

An additional advantage of the method and cylindrical glass body of the present invention is that optical waveguide fiber manufactured from such cylindrical glass bodies can now operate at any selected wavelength over a range of wavelengths from about 1300 nm to about 1680 nm without undo optical attenuation. More specifically, such fibers exhibit less than about 0.35 dB/km, and preferably less than about 0.31 dB/km at each wavelength within a wavelength range from about 1300 nm to about 1680 nm. Moreover, the method of the present invention is also economical to implement and can be practiced without the production of additional environmentally unfriendly waste products.

Additional features and advantages of the invention will be set forth in the detailed description which follows, and in part will be readily apparent to those skilled in the art from that description or recognized by practicing the invention as described herein, including the detailed description which follows, the claims, as well as the appended drawings.

It is to be understood that both the foregoing general description and the following detailed description are merely exemplary of the invention, and are intended to provide an overview or framework for understanding the nature and character of the invention as it is claimed. The accompanying drawings are included to provide a further understanding of the invention, and are incorporated in and constitute a part of this specification. The drawings illustrate various embodiments of the invention, and together with the description serve to explain the principles and operation of the invention.

BRIEF DESCRIPTION OF THE DRAWINGS

FIG. 6B is an enlarged cross-sectional view of the breakware shown positioned within the handle as depicted in FIG. 6A;

DETAILED DESCRIPTION OF THE PREFERRED EMBODIMENTS

Figure 1:
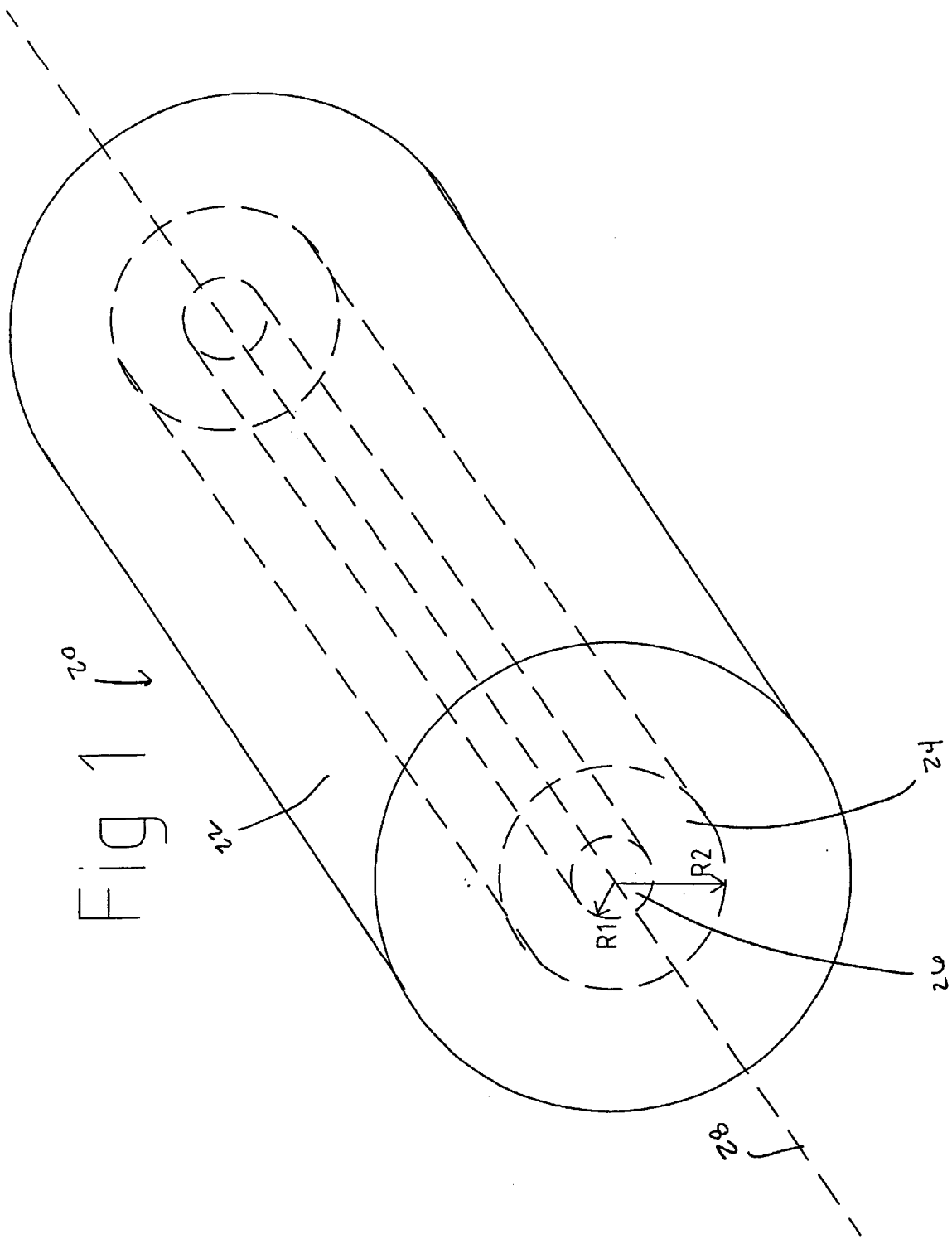
FIG. 1 is a perspective view of a cylindrical glass body shown depicting the centerline region $R_2$ in accordance with the present invention.

Reference will now be made in detail to the present preferred embodiments of the invention, examples of which are illustrated in the accompanying drawings. Whenever possible, the same reference numerals will be used throughout the drawings to refer to the same or like parts. An exemplary embodiment of the cylindrical glass body of the present invention is shown in FIG. 1, and is designated generally throughout by reference numeral 20. In accordance with the invention, cylindrical glass body 20 includes a silica containing glass region 22, at least a portion of which includes hydrogen bonded to oxygen. Silica containing glass region 22 includes a centerline region 24 having a weighted average OH content of less than about 2 ppb, and preferably less than about 1 ppb. Centerline region 24 bounds a smaller diameter dopant (preferably germania) containing region 26 (depicted by radial distance $R_1$), and both centerline region 24 and dopant containing region 26 extend longitudinally along central axis 28 of cylindrical glass body 20. Centerline region 24, represented by radial distance $R_2$ as depicted in FIG. 1, is defined as that portion of glass body 20 wherein about 99% of the propagated light travels. Stated differently, when the attenuation spectra of an optical waveguide fiber manufactured from glass body 20 is measured on a Photon-Kinetics attenuation measurement bench (PK Bench) at a wavelength of 1380 nm, optical attenuation measures less than about 0.35 dB/km and more preferably less than about 0.31 dB/km.

Figure 2:
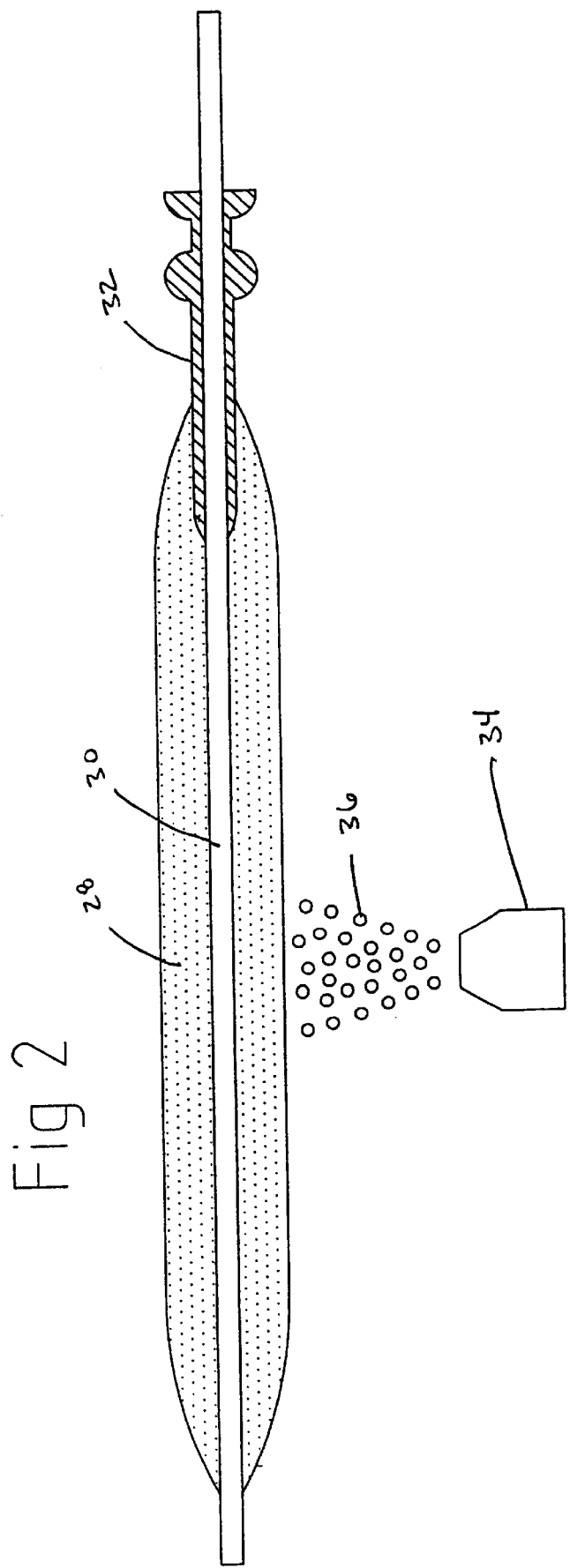
FIG. 2 schematically illustrates the manufacture of a porous body using an outside vapor deposition process in accordance with the present invention.

In accordance with the invention, cylindrical glass body 20 is preferably formed by chemically reacting at least some of the constituents of a moving fluid mixture including at least one glass-forming precursor compound in an oxidizing medium to form a silica-based reaction product. At least a portion of this reaction product is directed toward a substrate, to form a porous body, at least a portion of which includes hydrogen bonded to oxygen. The porous body may be formed, for example, by depositing layers of soot onto a bait rod via an OVD process. Such an OVD process is illustrated in FIG. 2. As shown in FIG. 2, a bait rod or mandrel 30 is inserted through a tubular handle 32 and mounted on a lathe (not shown). The lather is designed to rotate and translate mandrel 30 in close proximity with a soot-generating burner 34. As mandrel 30 is rotated and translated, silica-based reaction product 36, known generally as soot, is directed toward mandrel 30. At least a portion of silica-based reaction product 36 is deposited on mandrel 30 and on a portion of handle 32 to form a porous body 38 thereon. While this aspect of the present invention has been described in conjunction with a mandrel 30 that is traversed by a lathe, it will be understood by those skilled in the art that soot generating burner 34 can traverse rather than mandrel 30. Moreover, this aspect of the present invention is not intended to limit soot deposition to an OVD process. Rather, other methods of chemically reacting at least some of the constituents of a moving fluid mixture, such as, but not limited to, liquid delivery of at least one glass-forming precursor compound in an oxidizing medium can be used to form the silica-based reaction product of the present invention, as disclosed, for example, in U.S. Provisional Patent Application Serial No. 60/095,736, filed on Aug. 7, 1997, and PCT Application Serial No. PCT/US98/25608, filed on Dec. 3, 1998, the contents of which are hereby incorporated by reference. Moreover, other processes, such as the inside vapor (IV) deposition process, and modified chemical vapor deposition (MCVD) process are also applicable to the present invention.

Figure 3:
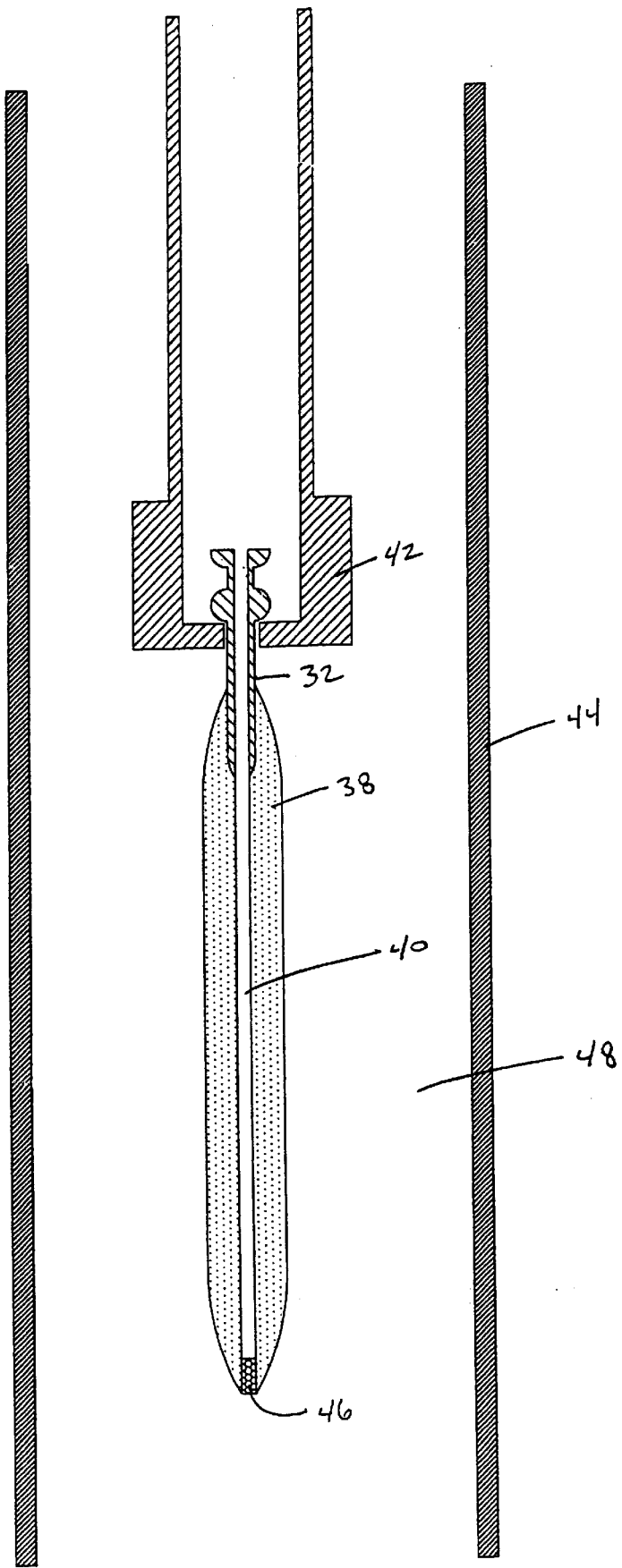
FIG. 3 is a cross-sectional view of the porous body of FIG. 2 shown suspended within a consolidation furnace.

Once the desired quantity of soot has been deposited on mandrel 30, soot deposition is terminated and mandrel 30 is removed from porous body 38. In accordance with the present invention and as depicted in FIG. 3, upon removal of mandrel 30, porous body 38 defines a centerline hole 40 passing axially therethrough. Preferably, porous body 38 is suspended by handle 32 on a downfeed handle 42 and positioned within a consolidation furnace 44. The end of centerline hole 40 remote from handle 32 is preferably fitted with a bottom plug 46 prior to positioning porous body 38 within consolidation furnace 44. Porous body 38 is preferably chemically dried, for example, by exposing porous body 38 to a chlorine containing atmosphere at elevated temperature within consolidation furnace 44. Chlorine containing atmosphere 48 effectively removes water and other impurities from porous body 38, which otherwise would have an undesirable effect on the properties of optical waveguide fiber manufactured from porous body 38. In an OVD formed porous body 38, the chlorine flows sufficiently through the soot to effectively dry the entire blank, including the region surrounding centerline hole 40. Following the chemical drying step, the temperature of the furnace is elevated to a temperature sufficient to consolidate the soot blank into a sintered glass preform, preferably about 1500° C. In accordance with the method of the present invention, centerline hole 40 is closed, either during or following the consolidation step, under conditions suitable to result in a solid sintered glass body that can be further processed to form an optical waveguide fiber exhibiting optical attenuation of less than about 0.35 dB/km, and preferably less than about 0.31 dB/km at a wavelength of 1380 nm. In the preferred embodiment, centerline region 24 has a weighted average OH content of less than about 1 ppb.

In the past, and as described earlier in this application, following chemical drying and consolidation, the glass preform was routinely exposed to a water containing environment, such as ambient atmosphere, for example, when the glass preform was removed from the consolidation furnace and moved to a redraw furnace for further processing steps. Invariably, optical waveguide fibers manufactured using such preforms exhibited excessively high levels of optical attenuation in the 1380 nm window. It has since been found that this high attenuation, known generally as the "water peak", is largely due to absorption of water by that portion of the glass preform surrounding the centerline hole prior to centerline hole closure. In fact, it is now recognized that physisorbed water ($OH_2$) and chemisorbed water (Beta OH) in the glass bounding the centerline hole results substantially instantaneously when the glass is exposed to an atmosphere containing a hydrogen compound such as, but not limited to water ($H_2O$). Moreover, the greater the exposure time, the greater the amount of water absorbed by the glass. Thus, any exposure to ambient atmosphere, or any atmosphere containing a hydrogen compound, no matter how short the period of time, will rewet that portion of the glass preform bounding the centerline hole. Such rewetting provides the impurities that cause the water peak exhibited by optical waveguide fibers manufactured using standard fiber manufacture processing techniques from blanks formed by an OVD process.

In accordance with the method of the present invention, centerline hole closure under conditions suitable to result in a solid glass body that can be used to manufacture an optical waveguide fiber that exhibits optical attenuation of less than about 0.31 dB/km at a wavelength of 1380 nm can be facilitated in a number of ways. In a first preferred embodiment of the method of the present invention, exposure of the centerline hole to an atmosphere containing a hydrogen compound is prevented following the steps of chemically drying and consolidating the porous body. In accordance with this embodiment, the centerline hole does not have an opportunity to be rewet prior to centerline hole closure. In a second preferred embodiment of the method of the present invention, water contained within the portion of the sintered glass preform surrounding the centerline hole as a result of rewetting following consolidation is chemically removed from the glass prior to centerline hole closure, preferably at redraw.

Figure 4:
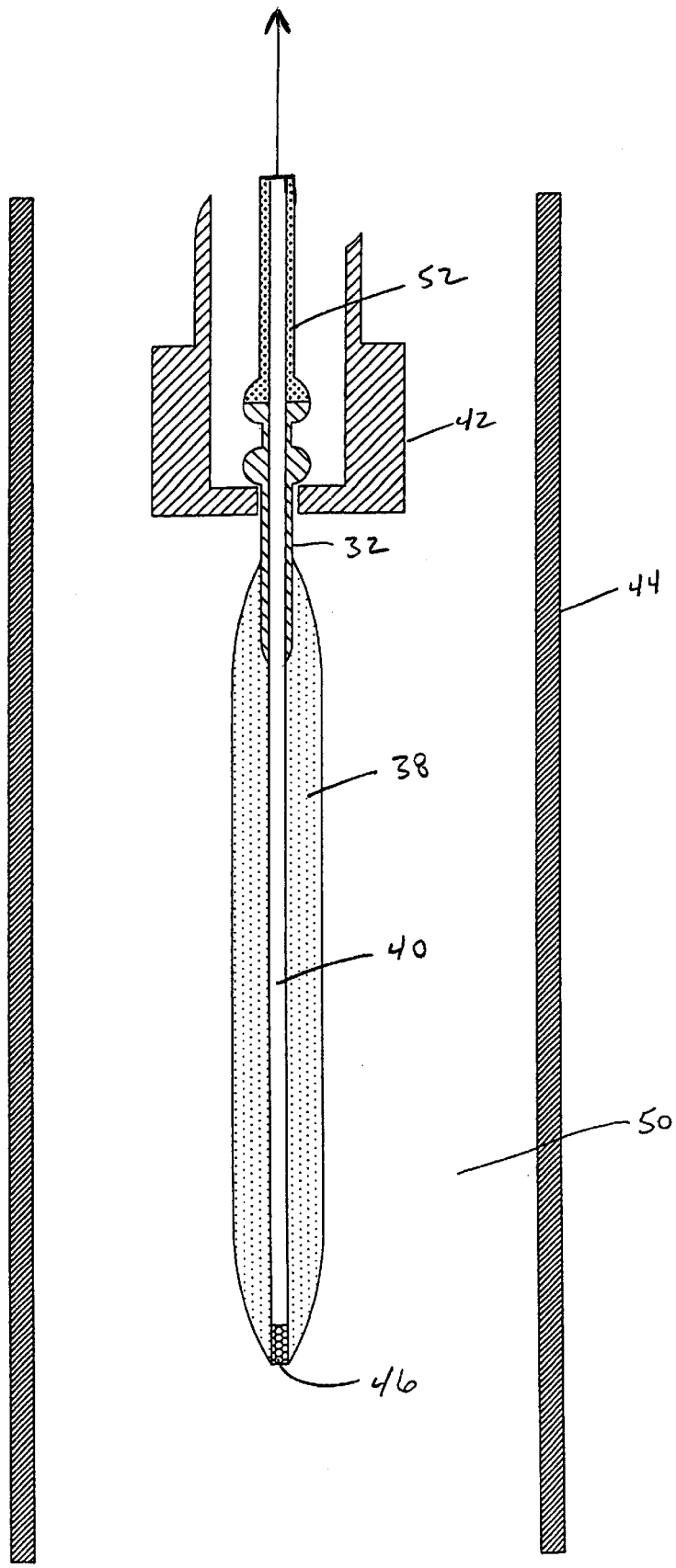
FIG. 4 is a cross-sectional view of the porous body of FIG. 2 shown suspended within a consolidation furnace in accordance with the first preferred embodiment of the present invention.

In accordance with the first preferred embodiment of the method of the present invention, rewetting of the glass bounding the centerline hole can be significantly reduced or prevented by closing the centerline hole during consolidation. As illustrated in FIG. 4, the end of centerline hole 40 remote from handle 32 is fitted with a glass plug 46 prior to the consolidation step. Following chlorine drying, porous body 38 is down driven into the hot zone (not shown) of consolidation furnace 44, preferably in an inert gas atmosphere 50, such as helium. The elevated temperature, preferably about 1500° C., generated in the hot zone sinters porous body 38 as it enters the hot zone. The inwardly directed sintering forces reduce the diameter of porous body 38 thereby closing porous body 38 onto plug 46 to effectively seal one end of centerline hole 40. Porous body 38 is further down driven to sinter the remainder of porous body 38 thereby forming a sintered glass preform having a centerline hole 40 sealed at its plugged ends. Following the consolidation step, the sintered glass preform is preferably withdrawn from the hot zone, and centerline hole 40 is exposed to a vacuum of at least 10 Torr, more preferably 100 mTorr, through an inner handle 52, which communicates with centerline hole 40 through handle 32. The sintered glass preform is again down driven into the hot zone of consolidation furnace 44 while centerline hole 40 is under vacuum. As the sintered glass preform enters the hot zone, it softens sufficiently so that the vacuum force acting on the glass bounding the centerline hole 40 draws the glass inward, thereby closing centerline hole 40 as the sintered glass preform continues to move through the hot zone. The resulting solid sintered glass preform can then be removed from consolidation furnace 44 and stored for further processing at a later time, or moved to a redraw furnace where it can be drawn into a reduced diameter cane. In either event, since centerline hole 40 is closed (i.e., the sintered glass preform has a solid centerline region), the centerline region will not be exposed to ambient atmosphere and thus will not be rewet upon removal from consolidation furnace 44.

Figure 5A:
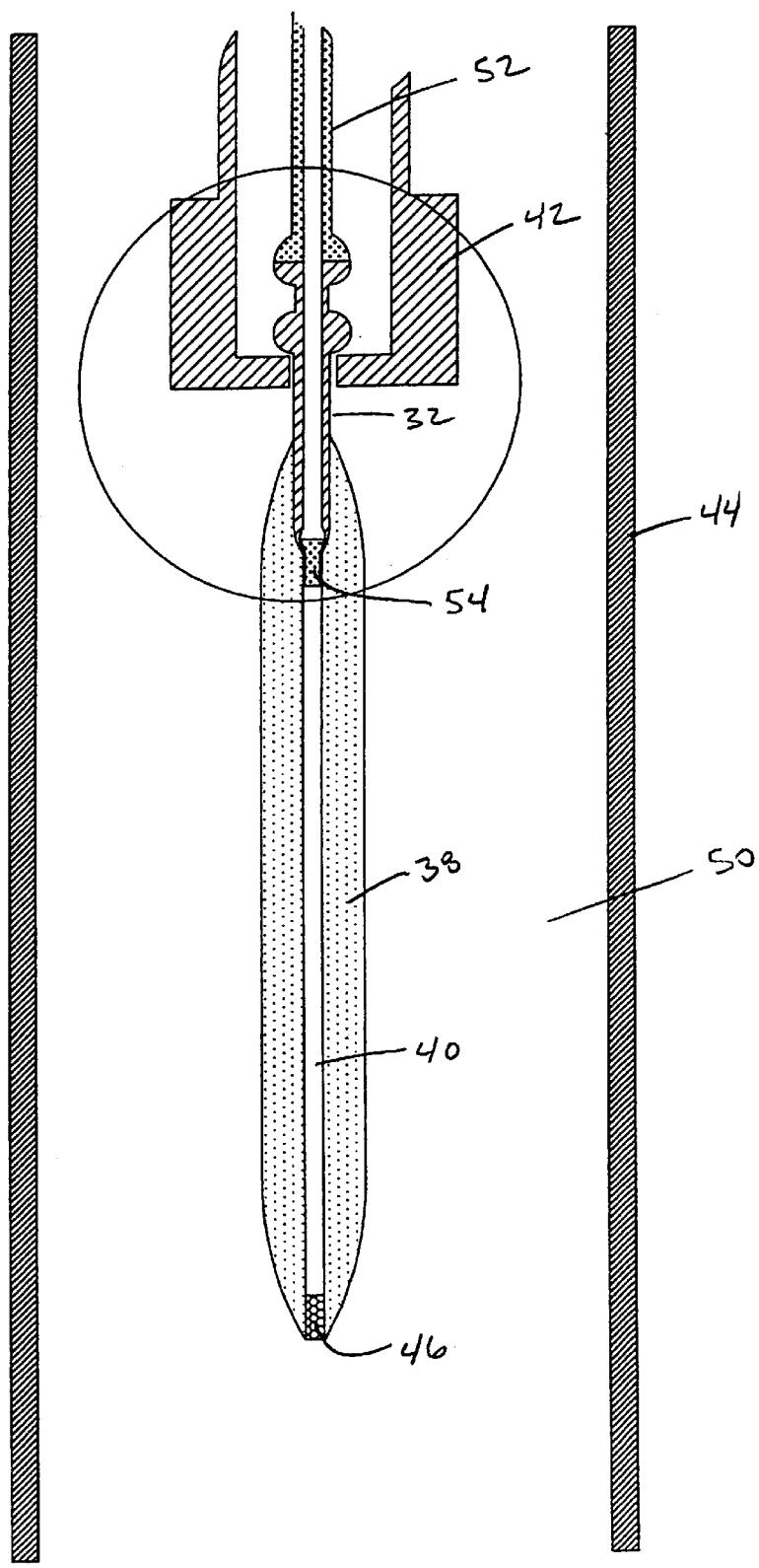
FIG. 5A is a cross-sectional view of the porous body of FIG. 2 shown fitted with a top plug and suspended within a consolidation furnace in accordance with the first preferred embodiment of the present invention.
Figure 5B:
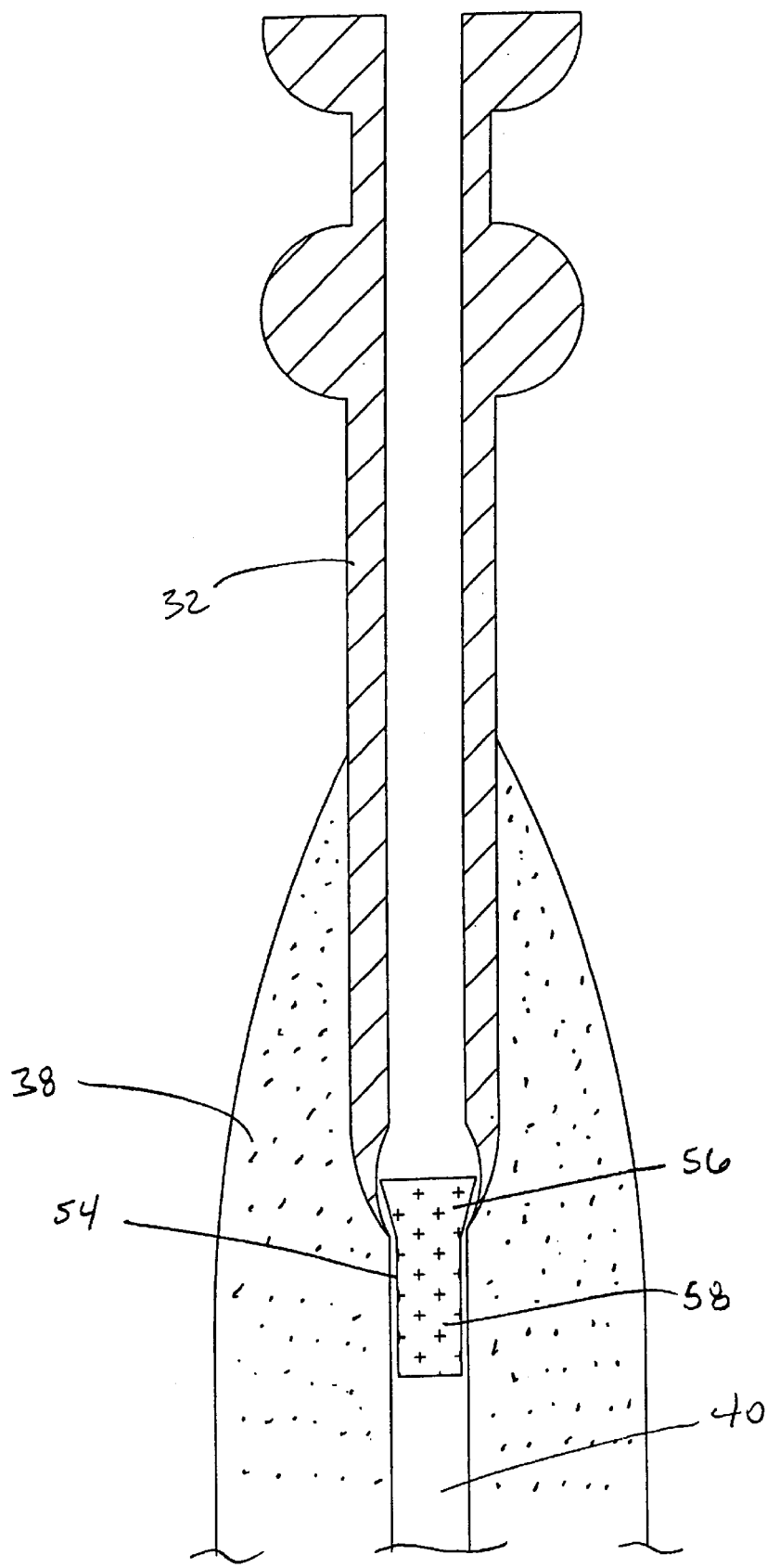
FIG. 5B is an enlarged cross-sectional view of the top plug shown positioned within the handle as depicted in FIG. 5A.

Alternatively, as illustrated in FIG. 5A, bottom plug 46 and top plug 54 are inserted into the opposed ends of centerline hole 40 prior to positioning porous body 38 within consolidation furnace 44. As shown in FIG. 5B, top plug 54 has an enlarged portion 56, which is held within handle 32, and a narrow portion 58, which extends into centerline hole 40. As described above with reference to FIG. 4, following chemical drying, porous body 38 is down driven into the hot zone of consolidation furnace 44. As porous body 38 enters the hot zone, it progressively sinters, first closing on bottom plug 46, and finally closing on top plug 54, thereby sealing centerline hole 40. Because sealing of the centerline hole occurs during consolidation, inert gas atmosphere 50 within consolidation furnace 44, preferably helium, will be trapped within the sealed centerline hole. Accordingly, the sintered glass preform is exposed to elevated temperature for a period of time sufficient to diffuse the inert gas from centerline hole 40. Diffusion is preferably carried out in a holding oven, but diffusion could be accomplished within the consolidation furnace as well. The diffusion of the inert gas from centerline hole 40 reduces the pressure within centerline hole 40 below that of the pressure outside of the sintered glass body, thereby forming a passive vacuum within sealed centerline hole 40.

More preferably, however, centerline hole 40 is placed under vacuum through inner handle 52 as shown in FIG. 5A prior to sintering the end of porous body 38 to top plug 54. In this embodiment, narrow portion 58 of top plug 54 is sized such that porous body 38 does not fully close onto top plug 54 as porous body 38 is consolidated into a sintered glass preform. Instead, following consolidation, centerline hole 40 is exposed to a reducing atmosphere by drawing vacuum through inner handle 52 as the sintered glass preform is down driven into the hot zone of consolidation furnace 44. Enlarged portion 56 of top plug 54 is shaped such that the inert gas within centerline hole 40 can pass by enlarged portion 56 of top plug 54 as vacuum is being pulled. As the atmosphere within centerline hole 40 is further reduced, the heated sintered glass is pulled into engagement with narrow portion 58 of top plug 54, thereby sealing centerline hole 40. Because the inert gas has been removed from centerline hole 40 by active vacuum, this embodiment of the present invention obviates the diffusing step and thus reduces overall processing time.

Figure 6A:
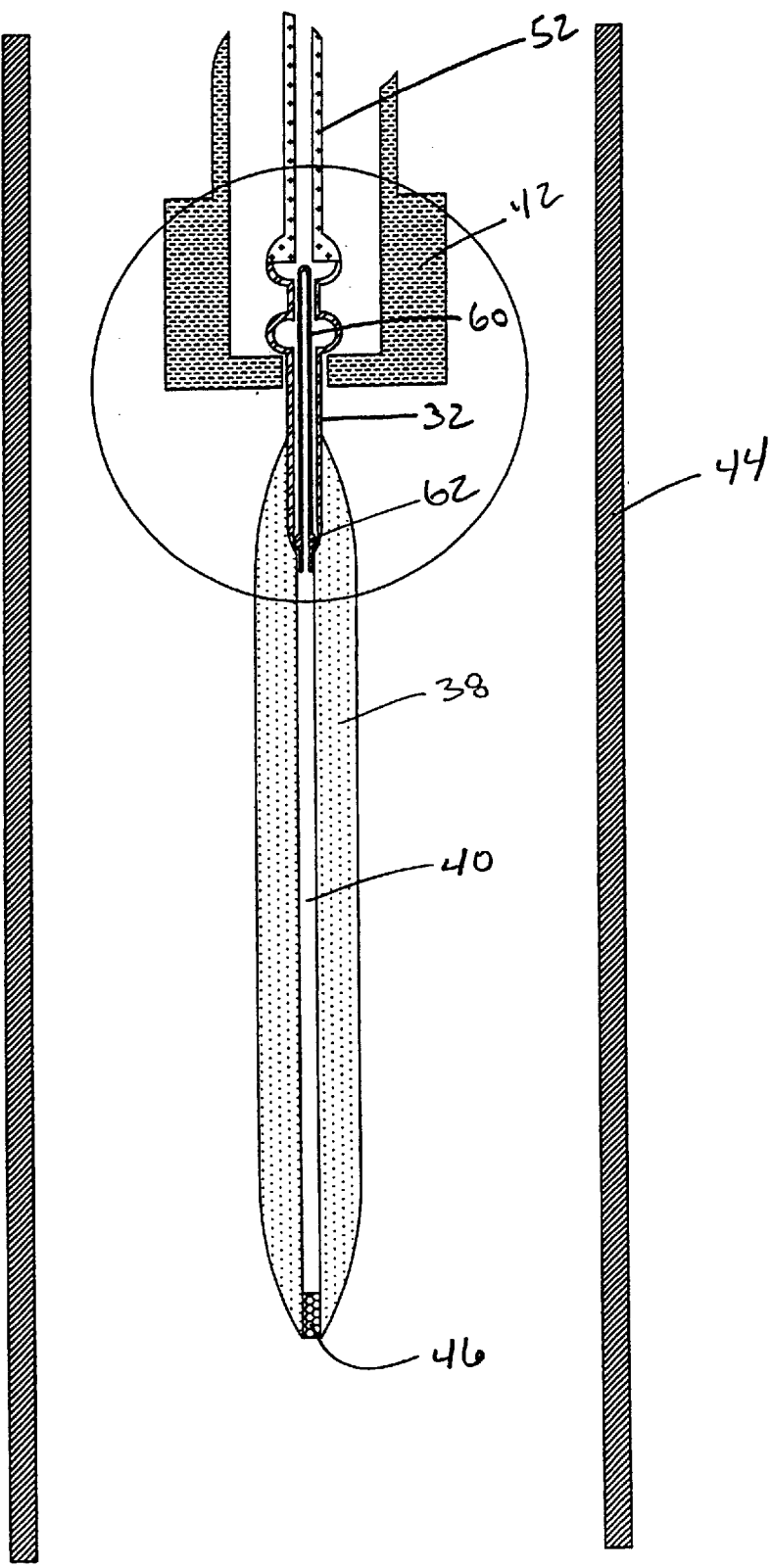
FIG. 6A is a cross-sectional view of the porous body of FIG. 2 shown fitted with breakware and suspended within a consolidation furnace in accordance with the first preferred embodiment of the present invention.

In a more preferred embodiment, glass plug 46 is positioned in centerline hole 40 at the end of porous body 38 remote from handle 32, and a hollow tubular glass member or breakware 60 having a open end facing plug 46 is positioned in centerline hole 40 opposite plug 46 as shown in FIG. 6A. As described above with reference to FIG. 5A, following chlorine drying, porous body 40 is down driven into the hot zone of consolidation furnace 44 to seal centerline hole 40 and consolidate porous body 38 into a sintered glass preform. This can be done by sealing both the top and bottom of centerline hole 40 with one pass of porous body 38 through the hot zone followed by diffusion of the inert gas from centerline hole 40 at elevated temperature, preferably in a holding oven, to form a passive vacuum within sealed centerline hole 40. As depicted in FIG. 6B, breakware 60, like top plug 54 described above, has an enlarged portion 62 for supporting breakware 60 within handle 32, and a narrow portion 64 extending into centerline hole 40 of porous body 38. Unlike top plug 54, however, breakware 60 preferably includes an elongated hollow portion 66 occupying a substantial portion of handle 32. Hollow portion 66 provides additional volume to centerline hole 40 thereby providing a better vacuum within centerline hole 40 following diffusion of the inert gas.

More preferably, however, centerline hole 40 is placed under vacuum through inner handle 52 prior to sintering the end of porous body 38 to narrow portion 64 of breakware 60. In this embodiment, narrow portion 64 of breakware 60 is sized such that porous body 38 does not fully close onto breakware 60 as porous body 38 is consolidated into a sintered glass preform. Instead, following consolidation, centerline hole 40 is exposed to a reducing atmosphere by drawing vacuum through inner handle 52 as the sintered glass preform is down driven into the hot zone of consolidation furnace 44. Enlarged portion 62 of breakware 60 is shaped such that the inert gas within centerline hole 40 can pass by enlarged portion 62 of breakware 60 as vacuum is being pulled. As the atmosphere within centerline hole 40 is further reduced, the heated sintered glass is pulled into engagement with narrow portion 64 of breakware 60, thereby sealing centerline hole 40. Because the inert gas has been removed from centerline hole 40 by active vacuum, this embodiment of the present invention obviates the diffusing step and thus reduces overall processing time. Moreover, the volume provided by elongated portion 66 of breakware 60 provides added volume to sealed centerline hole 40, advantages of which will be described in greater detail below.

As described above and elsewhere herein, bottom plug 46, top plug 54 and breakware 60 are preferably glass plugs having a water content of less than about 30 ppm by weight, such as fused quartz plugs, and preferably less than 5 ppb by weight, such as chemically dried silica plugs. Typically, such plugs are dried in a chlorine-containing atmosphere, but an atmosphere containing other chemical drying agents are equally applicable. Ideally, the glass plugs will have a water content of less than 1 ppb by weight. In addition, the glass plugs are preferably thin walled plugs ranging in thickness from about 200 $\mu$m to about 2 mm. Because many embodiments of the present invention rely upon diffusion of inert gas from the centerline hole after the centerline hole has been sealed to create a passive vacuum within the centerline hole, thin walled glass plugs can facilitate rapid diffusion of the inert gas from the centerline hole. The thinner the plug/breakware, the greater the rate of diffusion.

Following the above-described steps, the sintered glass preforms can be removed from consolidation furnace 44 and thereafter stored for further processing at a later time, preferably within a holding oven, or positioned within a redraw furnace where the glass preforms can be drawn into a reduced diameter cylindrical glass body such as a core cane, if desired. Because the sintered glass preform formed using the process illustrated in FIG. 4 has a closed centerline region, and because the sintered glass preforms formed using the processes illustrated in FIG. 5A and FIG. 6A have sealed centerline holes, the centerline region and the centerline holes are not accessible to ambient atmosphere, or any other environment that includes a hydrogen containing compound. Accordingly, the centerline region and centerline holes of the respective sintered glass preforms will remain dry during storage and/or en route to the redraw furnace.

Figure 7A:
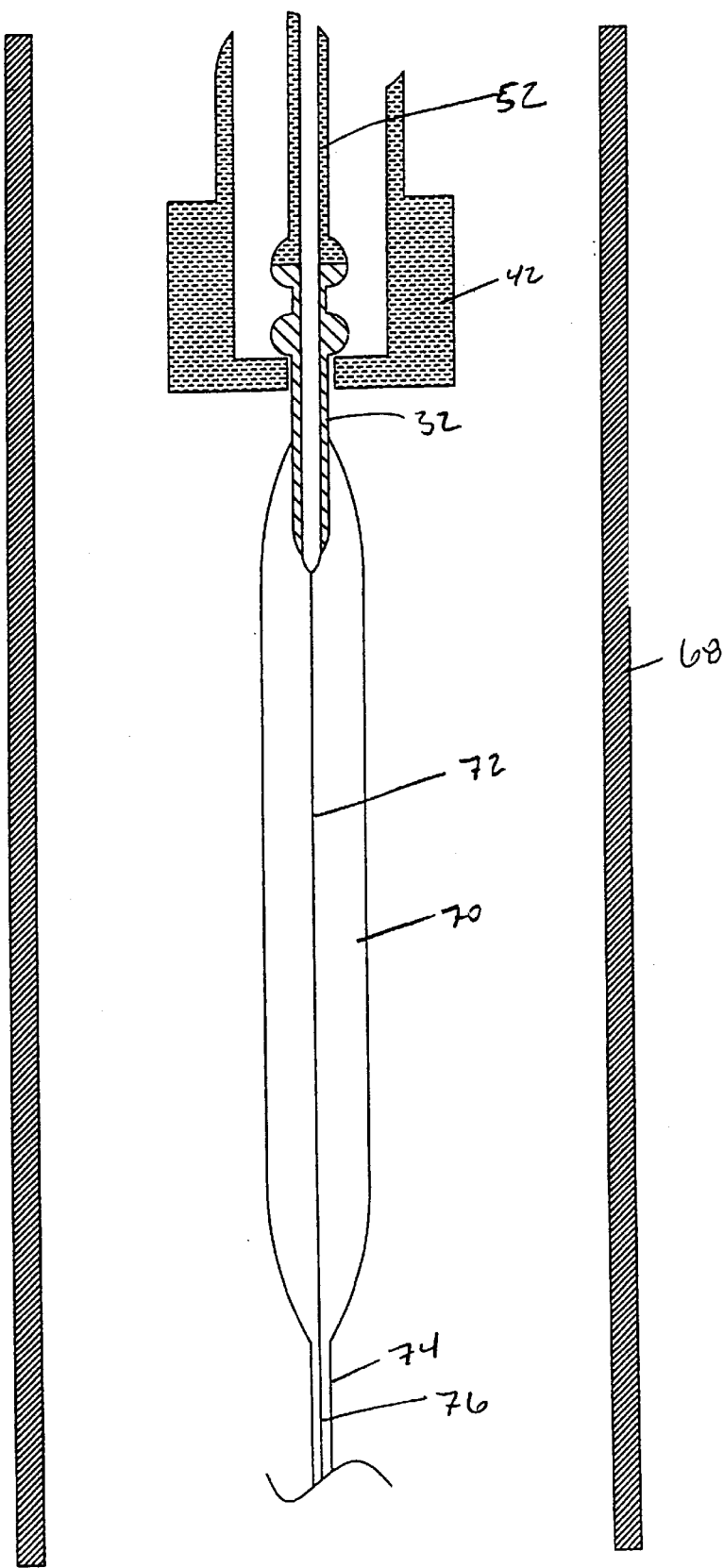
FIG. 7A is a cross-sectional view of a sintered glass preform resulting from consolidation of the porous body depicted in FIG. 4 shown being drawn into a reduced diameter core cane.
Figure 7B:
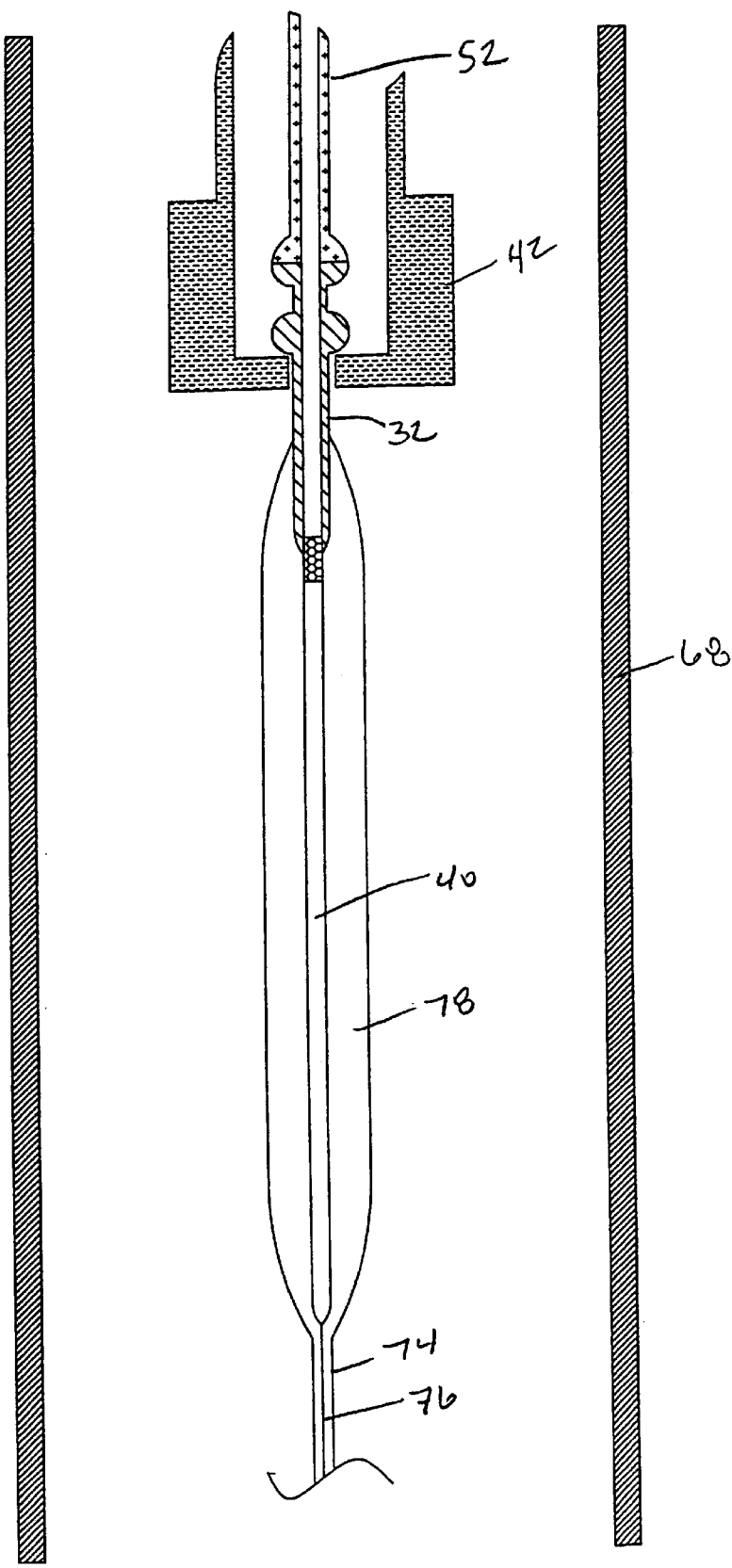
FIG. 7B is a cross-sectional view of a sintered glass preform resulting from consolidation of the porous body depicted in FIG. 5A shown being drawn into a reduced diameter core cane.
Figure 7C:
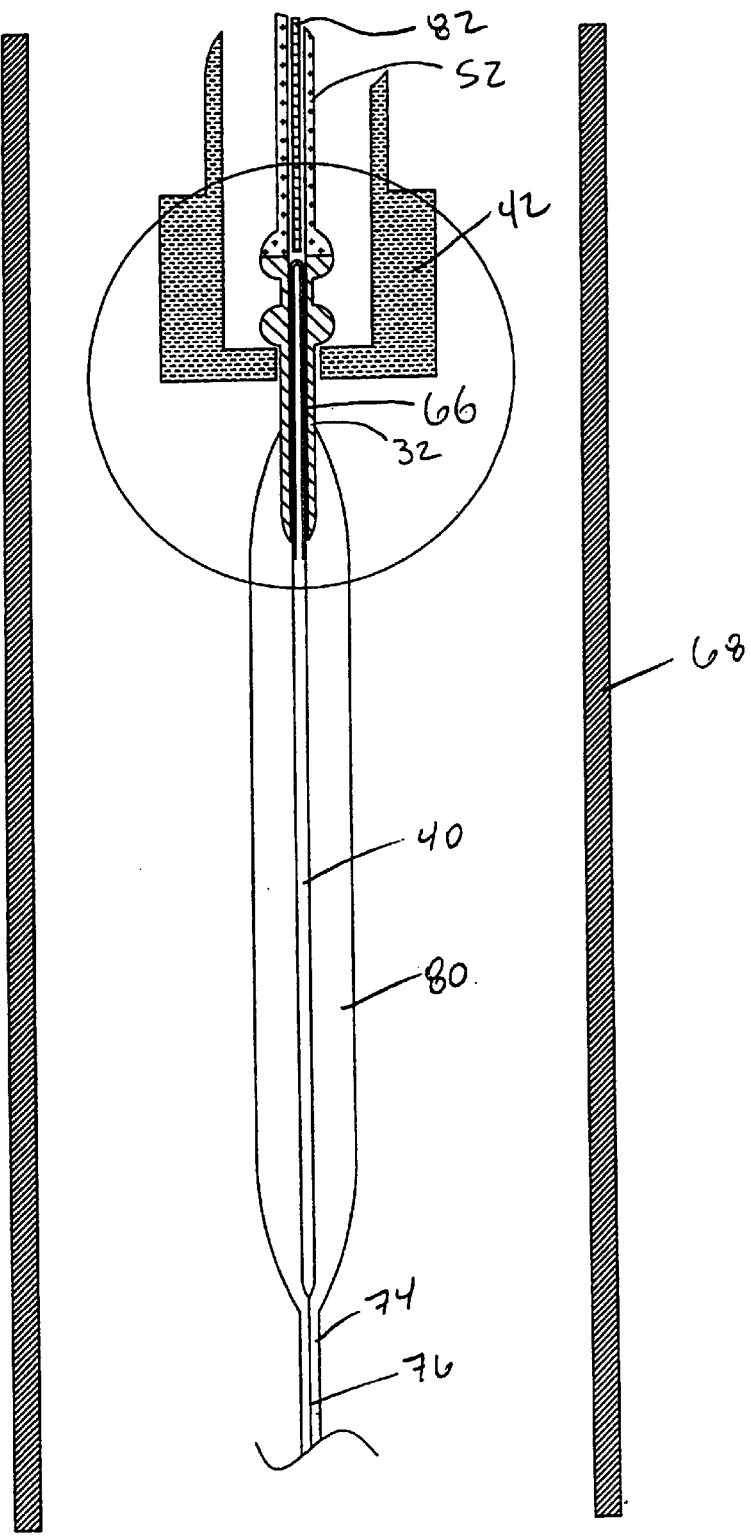
FIG. 7C is a cross-sectional view of a sintered glass preform resulting from consolidation of the porous body depicted in FIG. 6A shown being drawn into a reduced diameter core cane.
Figure 7D:
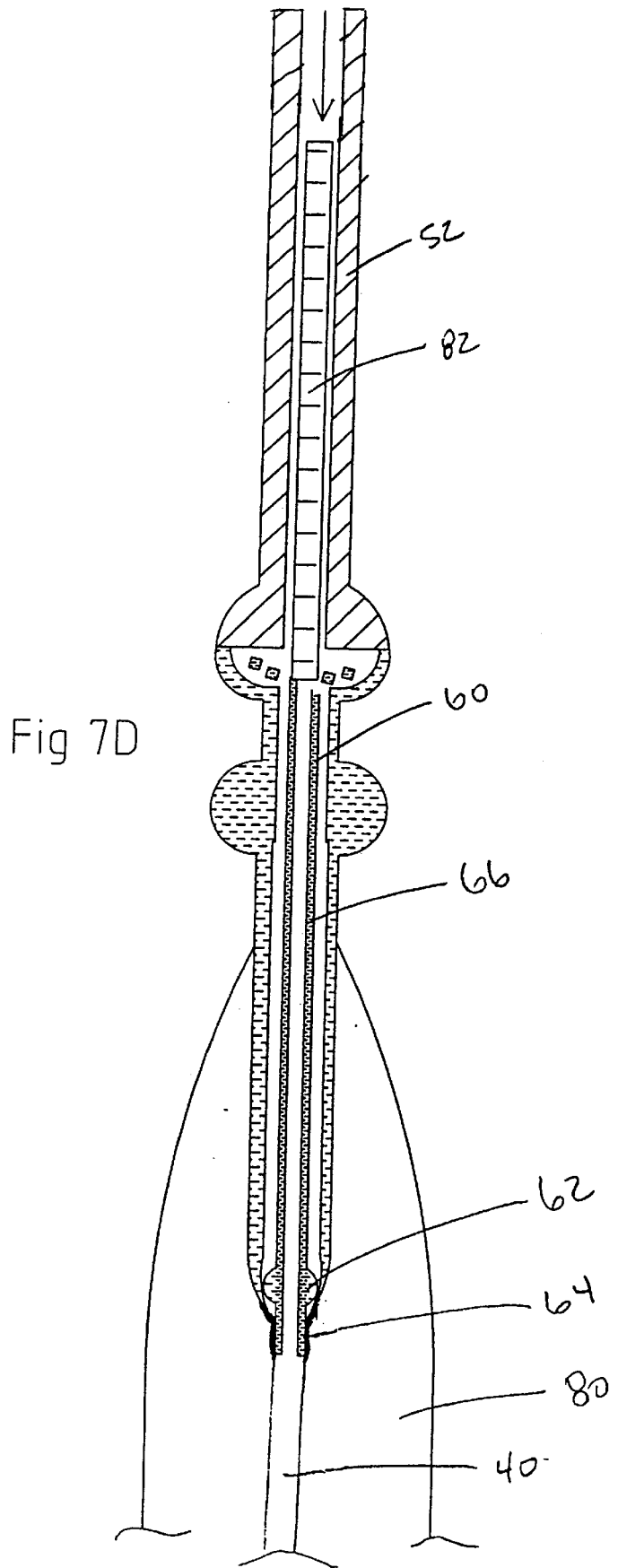
FIG. 7D is an enlarged cross-sectional view showing the breakware and operation of the plunger as depicted in FIG. 7C.

At redraw, the sintered glass preforms formed as described above are suspended within a furnace 68 by downfeed handles 42 as illustrated in FIGS. 7A, 7B, and 7C. The temperature within furnace 68 is elevated to a temperature which is sufficient to stretch the glass preforms, preferably about 1950° C. to about 2100° C., and thereby reduce the diameters of the preforms to form a cylindrical glass body such as a core cane. As depicted in FIG. 7A, sintered glass preform 70, corresponding to porous body 38 depicted in FIG. 4 and having a closed centerline region 72, is heated, preferably in an inert gas atmosphere such as He, and stretched to form a reduced diameter core cane 74 having a centerline region 76 extending axially therethrough. As shown in FIG. 7B, sintered glass preform 78, corresponding to porous body 38 depicted in FIG. 5A, is also heated and stretched to form a reduced core cane 74 having a centerline region 76. However, unlike sintered glass preform 70, sintered glass preform 78 includes centerline hole 40, which closes to form centerline region 76 during the redraw process. The reduced pressure maintained within sealed centerline hole 40, and created either actively or passively during consolidation, is generally sufficient to facilitate complete centerline hole 40 closure during redraw. As depicted in FIG. 7C, sintered glass preform 80, corresponding to porous body 38 depicted in FIG. 6A, is also heated and stretched to form a reduced diameter core cane 74 having a centerline region 76. Again, the reduced pressure maintained within sealed centerline hole 40, and created either actively or passively during consolidation is generally sufficient to facilitate complete centerline hole 40 closure during redraw. Additional methods for closing the centerline hole are disclosed, for example, in U.S. Provisional Patent Application No. 60/131,012, filed Apr. 26, 1999, titled "Optical Fiber Having Substantially Circular Core Symmetry and Method of Manufacturing Same". Moreover, centerline hole 40 closure is enhanced with this approach as a result of the additional volume provided to centerline hole 40 by hollow elongated portion 66 of breakware 60. As the volume of centerline hole 40 decreases due to the progressive centerline hole closure at redraw, elongated portion 66 of breakware 60 provides additional volume to centerline hole 40 so that adequate volume is available to maintain sufficient vacuum within centerline hole 40, thereby facilitating complete centerline hole closure. More preferably, however, as shown in FIG. 7D, prior to sintered glass preform 80 reaching its softening point, a plunger 82 or other mechanism, preferably passing through inner handle 52, can preferably be brought into contact with breakware 60 to break the breakware 60 while vacuum is being drawn through inner handle 52. Once breakware 60 is broken, and thereby opened at both ends, centerline hole 40 is continuously evacuated through the open ends of breakware 60 to facilitate centerline hole 40 closure as sintered glass preform 80 is softened and stretched to form core cane 74 having a closed centerline region 76.

In a second preferred embodiment of the method of the present invention, the focus is shifted from preventing rewetting of the centerline prior to centerline hole closure, to removal of water absorbed within the sintered preform glass surrounding the centerline hole due to rewetting following chemical drying and consolidation. While not critical, it is preferred that rewetting of the preform glass bounding the centerline hole be kept to a minimum as less OH and/or glass will need to be removed from that portion of the sintered glass preform bounding the centerline hole prior to centerline hole closure.

Figure 8:
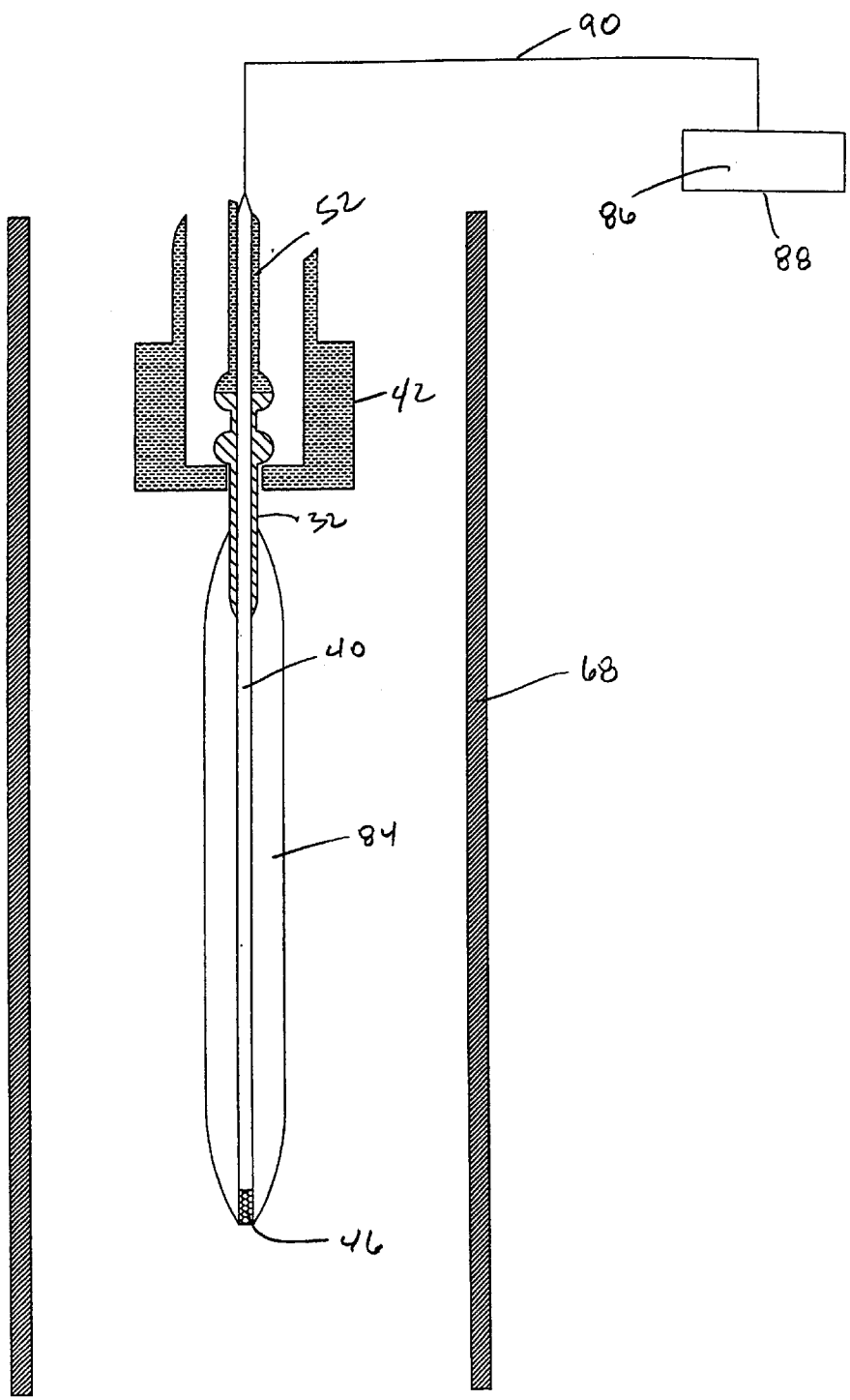
FIG. 8 is a cross-sectional view of a sintered glass preform shown positioned within a redraw furnace in accordance with the second preferred embodiment of the method of the present invention.

In one approach depicted in FIG. 8, a rewet glass preform 84 is disposed within the upper portion of furnace 68, preferably a redraw furnace, and exposed to elevated temperatures of about 1000° C. to about 1500° C. While being heated, the portion of the sintered glass preform 84 bounding centerline hole 40 is treated with an agent 86 delivered from container 88 to remove substantially all of the water (OH and/or $OH_2$) within the region of glass preform 84 bounding centerline hole 40. Preferably, agent 86 is a chemical drying agent such as $Cl_2$, $GeCl_4$, $SiCl_4$, $D_2$, or $D_2O$ delivered from container 88 via delivery line 90, through inner handle 52, and into centerline hole 40 as a liquid, or as a gas. Following chemical drying, sintered glass preform 84 is heated to approximately 2000° C. while centerline hole 40 is placed under vacuum through inner handle 52 to redraw glass preform 84 into a reduced diameter solid core cane (not shown).

Alternatively, rewet glass preform 84 is exposed to an agent 86 such as a chemical etching agent to remove a substantial portion of the water present residing in the portion of rewetted glass preform 84 bounding centerline hole 40. Preferably, a chemical etching agent, such as, but not limited to, $SF_6$ is delivered from container 88 through delivery line 90, and inner handle 52 into centerline hole 40 of rewet glass preform 84. Following chemical etching, glass preform 84 can be heated to a temperature of approximately 2000° C. while centerline hole 40 is exposed to vacuum through inner handle 52 to redraw sintered glass preform 84 into a reduced diameter core cane (not shown) if desired.

Figure 9:
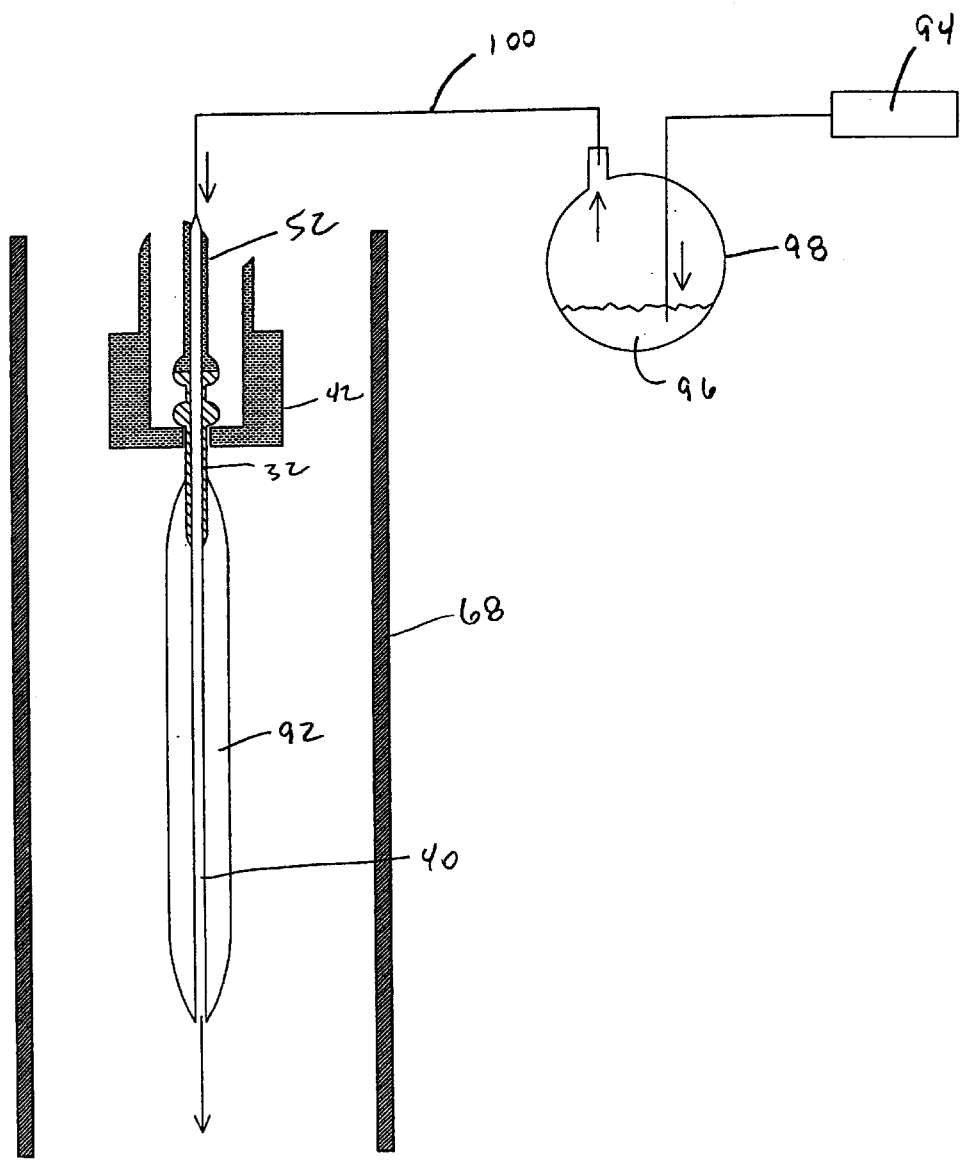
FIG. 9 is a cross-sectional view of a sintered glass preform shown positioned with a redraw furnace in accordance with the second preferred embodiment of the method of the present invention.

An additional approach to the second preferred embodiment of the method of the present invention is illustrated in FIG. 9. Rewetted glass preform 92 is positioned within the upper portion of furnace 68, and that portion of the glass bounding centerline hole 40 is exposed to a $D_2$) containing atmosphere. Because the diffusion characteristics of deuterium in silica containing glass are very similar to those of hydrogen, deuterium can diffuse through microscopic distances in relatively short periods of time. When the diffusing deuterium atoms encounter OH they undergo a reversible exchange reaction with the bonded hydrogen. Since the reaction is very efficient, the number of deuterium atoms need not greatly exceed the number of bonded hydrogen atoms residing within glass preform 70 to achieve substantial D/H exchange. The exchange reaction $D_2O + OH \leftrightarrows HOD + OD$ results. Following the reaction, the debonded hydrogen is mobile and will, unless undergoing a reverse reaction, encountering a trapping site, or becoming relatively immobile due to a drop in the preform temperature, diffuse out of the glass bounding centerline hole 40.

As illustrated in FIG. 9, a gas 94, preferably an inert gas such as He, N, or Ar is delivered into a $D_2O$ containing solution 96 within a flask 98. $D_2O$ carried by the inert gas, preferably helium, is then forced through a delivery line 100 to inner handle 52 communicating with centerline hole 40. The $D_2O$ is preferably flushed through centerline hole 40 for a sufficient time to facilitate the deuterium/hydrogen exchange process within rewetted glass preform 92. Glass preform 92 can then be moved to the hot zone of furnace 68 and exposed to temperatures of about 2000° C. As the glass softens, glass preform 92 is stretched to form a reduced diameter core cane (not shown) having a closed centerline region. A majority of the OD incorporated into glass preform 92 during the hydrogen/deuterium exchange process will be diffused by exposure to elevated temperature at redraw. However, any OD remaining in the resulting core cane (not shown) will contribute little to absorption of light in the relevant wavelength range, as the specific absorption due to OD is about two orders of magnitude less than that of OH in the relevant wavelength region, i.e., the 1380 nm window.

The reduced diameter core cane, a portion of which preferably constitutes cladding, produced by any of the above-described embodiments can be overclad, and subsequently drawn into an optical waveguide fiber having a central core portion bounded by a cladding glass. Due to the low weighted average OH content of the centerline region, the optical waveguide fiber exhibits an optical attenuation of less than about 0.35 dB/km at each wavelength within a wavelength range from about 1300 nm to about 1650 nm. Moreover, the optical waveguide fiber exhibits an optical attenuation of less than about 0.31 dB/km at a measured wavelength of 1380 nm.

Figure 10:
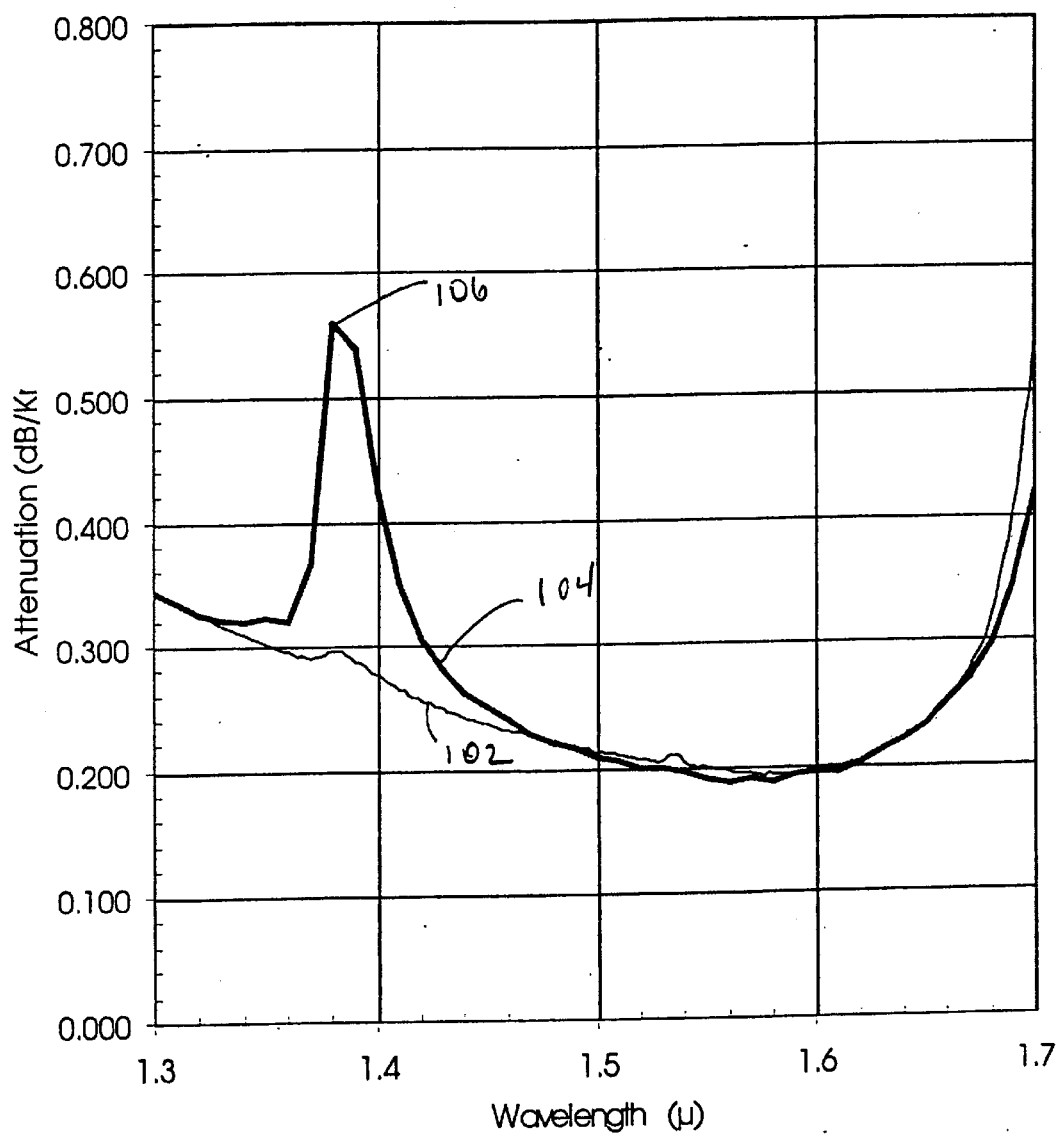
FIG. 10 is the spectral attenuation plot of an optical waveguide fiber of the present invention.

FIG. 10 illustrates the spectral attenuation plot 102 of an optical waveguide fiber manufactured in accordance with the invention by inserting a reduced diameter core cane or rod, made in accordance with the active vacuum embodiment of the present invention described herein with reference to FIG. 5A, into a soot cladding tube in accordance with a rod-in-soot tube method of fiber manufacture. As shown in FIG. 10, the resultant optical waveguide fiber exhibits optical attenuation of less than about 0.31 dB/km at a wavelength of 1380 nm. Thus, as evidenced by spectral attenuation plot 104, the water peak 106 exhibited by an optical waveguide fiber made by a conventional manufacturing process from an OVD preform has been substantially eliminated. While not shown in FIG. 10, it will be understood by those skilled in the art that spectral attenuation plots similar to spectral attenuation plot 102 can be obtained from other optical waveguide fibers incorporating a cylindrical glass body of the present invention and being overclad by methods other than rod-in-tube.

Figure 11:
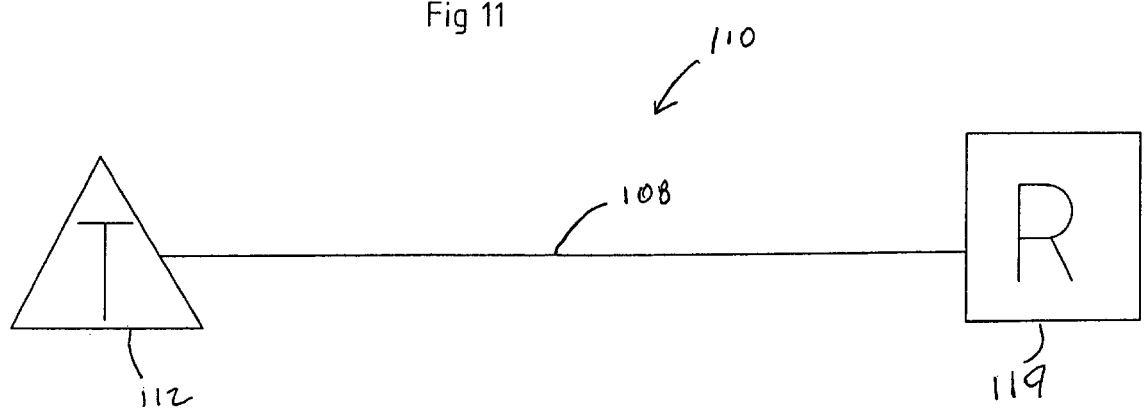
FIG. 11 is an optical fiber communication system in accordance with the present invention.

As shown in FIG. 11, and in accordance with another embodiment of the present invention, an optical fiber 108 manufactured in accordance with the present invention can form part of an optical fiber communication system 110. Optical fiber communication system 110 generally includes a transmitter 112, a receiver 114, and optical waveguide fiber 108 for communicating an optical signal between transmitter 112 and receiver 114. Within optical fiber communication system 110, optical waveguide fiber 108 exhibits an optical attenuation of less than about 0.31 dB/km at a measured wavelength 1380 nm.

EXAMPLES

The invention will be further clarified by the following examples, which are intended to be exemplary of the invention. For each example set forth below, it will be understood that distances are described as being measured from the top of the furnace muffle.

Example 1

A one meter soot blank, formed by an OVD process and fitted with a chemically dried tip plug positioned within the bottom of the centerline hole, was loaded into the top portion of a consolidation furnace maintained at a temperature of approximately 1000° C.–1200° C. to a depth of approximately 1090 mm. Prior to loading, a chemically dried solid top plug measuring approximately 15.5 cm long was disposed within the centerline hole at the top of the blank. The blank was initially pre-purged for approximately 15 minutes with a 20 SLPM He flow rate in the muffle and 1.5 SLPM He flow rate along the centerline hole. Purging was followed by a 240 minute drying step. During the drying step a flow rate of approximately 0.825 SLPM $Cl_2$ and 20 SLPM He was passed through the muffle. The blank was then downfed from 1090 mm to a depth of approximately 2730 mm into the hot zone of the furnace at a rate of about 5 mm/min. under a He flow rate of 20 SLPM within the muffle. At a depth of approximately 2510 mm, a 300 SCCM flow of $Cl_2$ was delivered through the centerline hole of the blank until the blank reached a depth of approximately 2540 mm, at which time the centerline flow of $Cl_2$ was terminated. At that depth, and upon termination of the centerline flow, a vacuum pump communicating with the centerline was activated to reduce the pressure within the centerline hole. Vacuum continued to be drawn until the bottom of the blank reached a depth of 2730 mm and the top portion of the blank closed on the top plug, thereby sealing the centerline hole. The sealed sintered preform was then drawn into a solid cane in a redraw furnace as a result of the reduced pressure contained within the sealed centerline hole. The cane was overcladded using the rod-in soot tube method, and the overcladded cane was chemically dried, consolidated, and thereafter drawn into an optical fiber, which exhibited the following optical attenuation:

| Attenuation Results: | | | | |
|---|---|---|---|---|
| 1310 nm | 1380 nm | 1550 nm | CUTOFF | FIBER DIA. |
| 0.336 dB/km | 0.301 dB/km | 0.245 dB/km | 1258 nm | 130 $\mu$m |

Example 2

A one meter soot blank, formed by an OVD process and fitted with a chemically dried tip plug positioned within the bottom of the centerline hole, was loaded into the top portion of a consolidation furnace maintained at a temperature of approximately 1000° C.–1200° C. to a depth of approximately 1090 mm. Prior to loading, a chemically dried solid top plug measuring approximately 17.0 cm long was disposed within the centerline hole at the top of the blank. The blank was initially pre-purged for approximately 15 minutes with a 60 SLPM He flow rate in the muffle. This was followed by a 60 minute drying step. During the drying step a 0.825 SLPM flow rate of $Cl_2$ and 20 SLPM flow rate of He was flowed through the muffle. The drying step was then followed by another purging step at a flow rate of 60 SLPM He to the muffle for 15 minutes. The muffle gas was then switched to deuterium oxide ($D_2O$) for 60 minutes, thereby exposing the blank, and thus the centerline hole, to $D_2O$. During this time the deuterium oxide bubbler was maintained at 82° C. while a He flow rate of 1.9 SLPM was passed through the $D_2O$ within the bubbler as a carrier gas. In addition there was 18 SLPM of He flowing through the muffle. After the blank was exposed to deuterium oxide for approximately 60 minutes, the blank was purged again for 15 minutes under 60 SLPM of flowing He in the muffle. A final drying step was performed where a $Cl_2$ flow rate of 0.825 SLPM and a He flow rate of 20 SLPM was delivered to the muffle for approximately 180 minutes. Following the drying step the blank was downfed further into the hot zone of the furnace from 1090 mm to a depth of 2730 mm at a rate of 5 mm/min. while an He flow rate of 20 SLPM was passed through the muffle. When the bottom of the blank reached a depth of 2435 mm, a vacuum pump communicating with the centerline hole was activated to reduce the pressure within the centerline hole. Vacuum continued to be drawn until the bottom of the blank reached a depth of 2730 mm and the top portion of the blank closed on the top plug, thereby sealing the centerline hole. The sealed sintered preform was then drawn into a solid cane in a redraw furnace as a result of the reduced pressure contained within the sealed centerline hole. The cane was overcladded using the rod-in soot tube method, and the overcladded cane was chemically dried, consolidated, and thereafter drawn into an optical fiber, which exhibited the following optical attenuation:

| Attenuation Results: | | | | |
|---|---|---|---|---|
| 1310 nm | 1380 nm | 1550 nm | CUTOFF | FIBER DIA. |
| 0.379 dB/km | 0.328 dB/km | 0.242 dB/km | 1300 nm | 120 $\mu$m |

Example 3

A one meter soot blank, formed by an OVD process and fitted with a chemically dried tip plug positioned within the bottom of the centerline hole, was loaded into the top portion of a consolidation furnace maintained at a temperature of approximately 1000° C.–1200° C. to a depth of approximately 1090 mm. Prior to loading, a chemically dried top plug (breakware) was disposed within the centerline hole at the top of the blank. The blank was initially pre-purged for approximately 15 minutes with a 20 SLPM He flow rate in the muffle and a 1.5 SLPM He flow rate along the centerline hole. Purging was followed by a 240 minute drying step. During the drying step a flow rate of approximately 0.825 SLPM $Cl_2$ and 20 SLPM He was passed through the muffle. The blank was then downfed from 1090 mm to a depth of approximately 2675 mm within the hot zone of the furnace at a rate of about 5 mm/min. under a He flow rate of 20 SLPM within the muffle. When the bottom of the blank reached a depth of approximately 2675 mm, a vacuum pump communicating with the centerline hole was activated to reduce the pressure within the centerline hole. Vacuum continued to be drawn for approximately 40 min. at which time the top portion of the blank closed on the top plug, thereby sealing the centerline hole. The sealed sintered preform was then positioned within a redraw furnace under an argon muffle and centerline purge. A plunger was then lowered through the inner handle to break the breakware, at which time the centerline argon purge was terminated and a vacuum pump engaged to draw vacuum through the centerline and evacuate the centerline hole. The centerline hole of the sintered preform was then closed under active vacuum during redraw to form a cane. The resultant cane was overcladded using the rod-in soot tube method, and the overcladded cane was chemically dried, consolidated, and thereafter drawn into optical fibers, which exhibited the following optical attenuation:

| Attenuation Results: | | | | |
|---|---|---|---|---|
| 1310 nm | 1380 nm | 1550 nm | CUTOFF | FIBER DIA. |
| 0.338 dB/km | 0.297 dB/km | 0.220 dB/km | 1168 nm | 115 $\mu$m |
| 0.337 dB/km | 0.301 dB/km | 0.20 dB/km | 1309 nm | 125 $\mu$m |

It will be apparent to those skilled in the art that various modifications and variations can be made to the present invention without departing from the spirit and scope of the invention. For example, the centerline hole could be sealed shut by flame torching the sintered glass preform to the top plug in the centerline hole after or while the sintered glass preform is withdrawn from the consolidation furnace under vacuum. Preferably, the sintered glass preform is removed from the consolidation furnace while an inert gas, free of hydrogen containing compounds, is flowed between the downfeed handle and inner handle to prevent water from entering the centerline hole between the joint formed by the preform handle and inner handle. Once the centerline hole is closed by flame torching, the inert gas flow can be terminated. Thus, it is intended that the present invention covers the modifications and variations of this invention provided they come within the scope of the appended claims and their equivalents.

What is claimed is:

1. A method of fabricating a cylindrical glass body for use in manufacturing optical waveguide fiber, said method comprising the steps of:
    a) chemically reacting at least some of the constituents of a moving fluid mixture comprising at least one glass-forming precursor compound and an oxidizing medium, the reaction resulting in the formation of a silica-based reaction product;
    b) depositing at least a part of said reaction product on a substrate to form a porous body thereon, at least a portion of said porous body including hydrogen bonded to oxygen;
    c) removing the substrate from said porous body, thereby forming a centerline hole extending axially through said porous body;
    d) consolidating and drying at least a portion of said porous body to form a glass preform; and
    e) closing the centerline hole and said drying, consolidating, and closing steps are performed under conditions suitable to result in a solid glass body suitable to make an optical fiber having an optical attenuation of less than about 0.35 dB/km at a wavelength of 1380 nm.

2. The method of claim 1 wherein said closing step results in a solid glass body suitable to make an optical fiber having an optical attenuation of less than about 0.31 dB/km at a wavelength of 1380 nm.

3. The method of claim 2 wherein the consolidating and drying step comprises chemically drying said porous body within a consolidation furnace to reduce the weighted average OH concentration within said porous body to less than about 1 ppb, and wherein said closing step is performed during said consolidating and drying step.

4. The method of claim 1 further comprising the step of replacing at least a portion of the hydrogen bonded to oxygen with deuterium in a deuterium/hydrogen exchange step carried out subsequent to step c), wherein said deuterium/hydrogen exchange step comprises delivering $D_2O$ into the centerline hole.

5. The method of claim 1 wherein said method further comprises purging said centerline chamber with a drying gas comprising a compound selected from the group consisting of $Cl_2$, $GeCl_4$, $SiCl_4$, $D_2$, and $D_2O$ subsequent to step d).

6. The method of claim 1 wherein said closing step comprises preventing at least the centerline hole from being exposed to an atmosphere comprising a hydrogen containing compound subsequent to step d).

7. The method of claim 6 wherein said preventing step comprises the step of creating a vacuum within the centerline hole.

8. The method of claim 7 wherein said preventing step comprises positioning a plug in the centerline hole at each end of said porous body, and heating said porous body in an inert gas atmosphere to a temperature sufficient to sinter each end of said porous body to said plugs, thereby sealing the centerline hole.

9. The method of claim 8 wherein said preventing step comprises positioning a chemically dried glass plug in the centerline hole at each end of said porous body, the chemically dried glass plug having an OH content of less than about 1 ppb by weight.

10. The method of claim 8 wherein said preventing step comprises heating said porous body to diffuse the inert gas from the sealed centerline hole.

11. The method of claim 10 wherein said closing step comprises the steps of:
    positioning said glass body in a furnace;
    heating said glass body within said furnace; and
    drawing said glass body into a cane having an outside diameter smaller than the outside diameter of said glass body.

12. The method of claim 8 wherein said preventing step further comprises exposing the centerline hole to a pressure reducing atmosphere through at least one end of said porous body during said heating step.

13. The method of claim 12 wherein at least one of said plugs is breakable, and wherein said closing step comprises the steps of:
    positioning said glass body in a furnace;
    breaking said plug;
    exposing the centerline hole to a pressure-reducing atmosphere;
    heating said blank during said exposing step; and
    drawing said glass body into a cane having an outside diameter smaller than the outside diameter of said glass body.

14. A cylindrical glass body for use in manufacturing optical waveguide fiber made by the method of claim 1.

15. The method of claim 1 wherein said method further comprises the step of chemically etching at least a portion of the glass body surrounding the centerline hole prior to step e).

16. A method of fabricating a cylindrical glass body for use in manufacturing optical waveguide fiber, said method comprising the steps of:
    a) chemically reacting at least some of the constituents of a moving fluid mixture comprising at least one glass-forming precursor compound and an oxidizing medium, the reaction resulting in the formation of a silica-based reaction product;
    b) depositing at least a part of said reaction product on a substrate to form a porous body thereon, at least a portion of said porous body including hydrogen bonded to oxygen;
    c) removing the substrate from said porous body, thereby forming a centerline hole extending axially through said porous body;
    d) consolidating and drying at least a portion of said porous body to form a glass preform; and
    e) closing the centerline hole and said drying, consolidating, and closing steps are performed under conditions suitable to result in a solid glass body including a centerline region having a weighted average OH content of less than about 1 ppb.

17. A method of fabricating a cylindrical glass body for use in manufacturing optical waveguide fiber, said method comprising the steps of:
    a) chemically reacting at least some of the constituents of a moving fluid mixture comprising at least one glass-forming precursor compound and an oxidizing medium, the reaction resulting in the formation of a silica-based reaction product;
    b) depositing at least a part of said reaction product on a substrate to form a porous body thereon, at least a portion of said porous body including hydrogen bonded to oxygen;

c) removing the substrate from said porous body, thereby forming a centerline hole extending axially through said porous body;

d) consolidating and drying at least a portion of said porous body to form a glass preform; and e) closing the centerline hole;

wherein said closing step comprises preventing at least the centerline hole from being exposed to an atmosphere comprising a hydrogen containing compound subsequent to step d);

wherein said preventing step comprises: the step of creating a vacuum within the centerline hole; positioning a plug in the centerline hole at each end of said porous body, and heating said porous body in an inert gas atmosphere to a temperature sufficient to sinter each end of said porous body to said plugs, thereby sealing the centerline hole; and exposing the centerline hole to a pressure reducing atmosphere through at least one end of said porous body during said heating step;

wherein at least one of said plugs is breakable; and wherein said closing step comprises the steps of:
positioning said glass body in a furnace;
breaking said plug;
exposing the centerline hole to a pressure-reducing atmosphere;
heating said blank during said exposing step; and
drawing said glass body into a cane having an outside diameter smaller than the outside diameter of said glass body, and said drying, consolidating, and closing steps are performed under conditions suitable to result in a solid glass body suitable to make an optical fiber having an optical attenuation of less than about 0.35 dB/km at a wavelength of 1380 nm.

18. A method of fabricating a cylindrical glass body for use in manufacturing optical waveguide fiber, said method comprising the steps of:

a) chemically reacting at least some of the constituents of a moving fluid mixture comprising at least one glass-forming precursor compound and an oxidizing medium, the reaction resulting in the formation of a silica-based reaction product;

b) depositing at least a part of said reaction product on a substrate to form a porous body thereon, at least a portion of said porous body including hydrogen bonded to oxygen;

c) removing the substrate from said porous body, thereby forming a centerline hole extending axially through said porous body;

d) positioning plugs in the centerline hole at each end of said porous body; and e) consolidating and drying at least a portion of said porous body to form a glass preform under conditions suitable to result in a glass body including a centerline region having a weighted average OH content of less than about 1 ppb.

19. The method of claim 18 wherein at least one of the plugs is a chemically dried plug.

20. The method of claim 19 wherein at least one of the plugs has an OH content of less than about 30 ppm by weight.

21. The method of claim 18 further comprising breaking at least one of said plugs.

22. The method of claim 18 further comprising breaking at least one of said plugs after the consolidating and drying step.

23. The method of claim 18 wherein the plugs comprise a hollow plug with an open end facing the centerline hole.

24. The method of claim 18 wherein at least one end of said porous body closes on at least one of said plugs during the consolidation step, thereby sealing at least one end of the centerline hole.

25. The method of claim 24 further comprising exposing the centerline hole to a pressure reducing atmosphere.

26. The method of claim 18 wherein an end of said porous body closes on one of said plugs during the consolidation step, thereby sealing an end of the centerline hole.

27. The method of claim 26 wherein the other end of said porous body closes on another one of said plugs during the consolidation step, thereby sealing both ends of the centerline hole.

28. The method of claim 27 further comprising creating a vacuum within the centerline hole.

29. The method of claim 28 wherein the vacuum creating step comprises heating the glass preform.

30. The method of claim 26 wherein the centerline hole is exposed to a pressure reducing atmosphere during the consolidation step.

31. The method of claim 30 wherein another end of said porous body closes on another one of said plugs during the consolidation step, thereby sealing both ends of the centerline hole.

32. The method of claim 18 further comprising closing the centerline hole.

33. The method of claim 32 wherein said closing step comprises the steps of:
positioning said glass body in a furnace;
heating said glass body within said furnace; and
drawing said glass body into a cane having an outside diameter smaller than the outside diameter of said glass body.

34. The method of claim 22 wherein at least one of said plugs is breakable, and wherein said closing step comprises the step of breaking said plug.

35. The method of claim 34 wherein said closing step further comprises the step of exposing the centerline hole to a pressure-reducing atmosphere after the plug is broken.

36. The method of claim 34 wherein said closing step further comprises the step of heating said glass body.

37. The method of claim 36 wherein said glass body is heated during said exposing step.

38. The method of claim 34 wherein said closing step further comprises heating and drawing said glass body into a cane having an outside diameter smaller than the outside diameter of said glass body.

* * * * *

UNITED STATES PATENT AND TRADEMARK OFFICE
CERTIFICATE OF CORRECTION

PATENT NO. : 6,477,305 B1
DATED : November 5, 2002
INVENTOR(S) : Berkey George E. et al.

It is certified that error appears in the above-identified patent and that said Letters Patent is hereby corrected as shown below:

<u>Column 18,</u>
Line 44, "34. The method of claim 22 wherein at least one of said" should be
-- 34. The method of claim 32 wherein at least one of said --

Signed and Sealed this

Twenty-fourth Day of June, 2003

JAMES E. ROGAN
*Director of the United States Patent and Trademark Office*